(12) United States Patent
Chong et al.

(10) Patent No.: US 11,743,140 B2
(45) Date of Patent: Aug. 29, 2023

(54) RESOURCE MANAGEMENT METHOD AND APPARATUS

(71) Applicant: Huawei Technologies Co., Ltd., Shenzhen (CN)

(72) Inventors: Weiwei Chong, Shanghai (CN); Xiaobo Wu, Shanghai (CN); Yang Xin, Shanghai (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 17/126,834

(22) Filed: Dec. 18, 2020

(65) Prior Publication Data

US 2021/0105193 A1  Apr. 8, 2021

Related U.S. Application Data

(63) Continuation of application No. PCT/CN2019/091980, filed on Jun. 20, 2019.

(30) Foreign Application Priority Data

Jun. 20, 2018 (CN) .......................... 201810639153.9
Nov. 27, 2018 (CN) .......................... 201811428448.8

(51) Int. Cl.
*H04L 41/5019* (2022.01)
*H04L 41/5003* (2022.01)
*H04L 47/78* (2022.01)

(52) U.S. Cl.
CPC ...... *H04L 41/5019* (2013.01); *H04L 41/5003* (2013.01); *H04L 47/78* (2013.01)

(58) Field of Classification Search
CPC ... H04L 41/5009; H04L 67/02; H04L 1/1896; H04L 5/0051; H04L 67/12; H04L 1/1854;
(Continued)

(56) References Cited

U.S. PATENT DOCUMENTS 10,516,583 B1 * 12/2019 Wakhare ............. H04L 41/5019
2016/0352924 A1   12/2016 Senarath et al.
(Continued)

FOREIGN PATENT DOCUMENTS

CN        101364951 A    2/2009
CN        102025624 A    4/2011
(Continued)

OTHER PUBLICATIONS

3GPP TS 23.501 V15.2.0 (Jun. 2018) "3rd Generation Partnership Project; Technical Specification Group Services and System Aspects; System Architecture for the 5G System; Stage 2(Release 15)," 217 pages.
(Continued)

*Primary Examiner* — Djenane M Bayard
(74) *Attorney, Agent, or Firm* — Conley Rose, P.C.

(57) ABSTRACT

A method includes obtaining a first service experience data set of a service, where each piece of first service experience data in the first service experience data set indicates service quality of all users or a plurality of users in a network, wherein the service is executed by the users, and the service is run in the network, obtaining information about a first service quality requirement of the service, where the information about the first service quality requirement indicates a requirement on the first service experience data, and determining a second network data set of the network based on the first service experience data set, a first network data set of the network, and the information about the first service quality requirement.

20 Claims, 9 Drawing Sheets

(58) Field of Classification Search
CPC ..... H04L 1/1861; H04L 67/32; H04L 5/0098; H04L 67/14; H04L 41/5051; H04L 45/38; H04L 67/16; H04L 43/08; H04L 45/42; H04L 5/005; H04L 69/22; H04L 41/5003; H04L 45/24; H04L 67/06; H04L 27/26; H04L 29/06; H04L 5/0064; H04L 63/029; H04L 12/66; H04L 41/0816; H04L 47/70; H04L 47/805; H04L 41/0896; H04L 47/24; H04L 67/10; H04L 41/40; H04L 41/5019; H04L 47/824; H04L 63/0272; H04L 47/762; H04L 9/3247; H04L 41/5025; H04L 45/02; H04L 43/0817; H04L 43/0852; H04L 45/302; H04L 47/15; H04L 47/808; H04L 47/822; H04L 65/80; H04L 41/145; H04L 47/825; H04L 41/0893; H04L 41/5067; H04L 47/826; H04L 63/02; H04L 63/0218; H04L 63/18; H04L 41/0894; H04L 12/1407; H04L 12/14; H04L 5/0053; H04L 47/10; H04L 5/0048; H04L 41/12; H04L 41/22; H04L 65/1069; H04L 5/0094; H04L 47/2416; H04L 43/0829; H04L 45/22; H04L 5/001; H04L 41/0213; H04L 43/16; H04L 47/13; H04L 65/1101; H04L 47/20; H04L 12/1403; H04L 41/5054; H04L 45/00; H04L 5/0007; H04L 5/0044; H04L 43/087; H04L 43/50; H04L 47/2408; H04L 65/1104; H04L 1/1812; H04L 12/2801; H04L 41/0895; H04L 43/0876; H04L 43/12; H04L 67/51; H04L 12/1485; H04L 41/0806; H04L 43/20; H04L 47/12

See application file for complete search history.

(56) References Cited

U.S. PATENT DOCUMENTS

| | | |
|---|---|---|
| 2016/0353268 A1 | 12/2016 | Senarath et al. |
| 2017/0332282 A1 | 11/2017 | Dao |
| 2018/0287891 A1* | 10/2018 | Shaw .................... H04W 24/02 |
| 2019/0075029 A1* | 3/2019 | Zavesky ................ H04L 47/24 |
| 2019/0357129 A1* | 11/2019 | Park ...................... H04W 60/04 |
| 2021/0250251 A1* | 8/2021 | Fan ..................... H04L 41/5009 |

FOREIGN PATENT DOCUMENTS

| | | |
|---|---|---|
| CN | 103747429 A | 4/2014 |
| EP | 3172863 A1 | 5/2017 |
| WO | 2012004689 A1 | 1/2012 |
| WO | 2016014738 A1 | 1/2016 |

OTHER PUBLICATIONS

3GPP TS 23.502 V15.2.0 (Jun. 2018) "3rd Generation Partnership Project; Technical Specification Group Services and System Aspects; Procedures for the 5G System; Stage 2(Release 15)," 308 pages.

3GPP TS 28.531 V1.0.0 (Jun. 2018) "3rd Generation Partnership Project; Technical Specification Group Services and System Aspects; Management and orchestration of networks and network slicing; Provisioning;Stage 1 (Release 15)," 31 pages.

3GPP TS 28.541 V1.0.0 (Jun. 2018) "3rd Generation Partnership Project; Technical Specification Group Services and System Aspects; Telecommunication Management;Management and orchestration of networks and network slicing; NR and NG-RAN Network Resource Model (NRM); Stage 2 and stage 3 (Release 15 )," 35 pages.

3GPP TS 28.550 V1.0.0 (Jun. 2018) "3rd Generation Partnership Project; Technical Specification Group Services and System Aspects; Management and orchestration of networks and network slicing; Performance Management; Stage 1 (Release 15)," 27 pages.

3GPP TS 28.552 V0.3.0 (May 2018) "3rd Generation Partnership Project; Technical Specification Group Services and System Aspects; Management and orchestration of networks and network slicing; NR and NG-RAN performance measurements and assurance data (Release 15)," 18 pages.

3GPP TS 28.554 V1.0.0 (Jun. 2018) "3rd Generation Partnership Project; Technical Specification Group Services and System Aspects; Telecommunication management; Management and orchestration of networks and network slicing; 5G End to end Key Performance Indicators (KPI), performance measurements and assurance data (Release 15)," 15 pages.

3GPP TS 29.244 V15.2.0, Jun. 2018, 3rd Generation Partnership Project; Technical Specification Group Core Network and Terminals; Interface between the Control Plane and the User Plane Nodes; Stage 3 (Release 15), 176 pages.

* cited by examiner

RESOURCE MANAGEMENT METHOD AND APPARATUS

CROSS-REFERENCE TO RELATED APPLICATIONS

This application is a continuation of International Patent Application No. PCT/CN2019/091980 filed on Jun. 20, 2019, which claims priority to Chinese Patent Application No. 201811428448.8 filed on Nov. 27, 2018 and Chinese Patent Application No. 201810639153.9 filed on Jun. 20, 2018. The disclosures of the aforementioned applications are hereby incorporated by reference in their entireties.

TECHNICAL FIELD

Embodiments of this application relate to the field of communications technologies, and in particular, to a resource management method and apparatus.

BACKGROUND

With continuous emergence of various communications services, requirements of different communications services on network performance are significantly different. The concept of a network slice (NS) is introduced into a 5th-generation (5G) system, to cope with a difference between the requirements of the different communications services on the network performance. To be specific, resource and function division is performed on a 5G network, to form different network slices to satisfy the different requirements such that network operation investment costs can be reduced, and network operation modes can be enriched.

A network management device determines, for network slices of different tenants, service-level agreement (SLA) templates of the network slices of the different tenants based on a service level requirement of each tenant, and deploys the corresponding network slices based on the SLA templates. However, granularities of the SLA templates determined by the network management device based only on the service level requirement of each tenant are quite coarse. Therefore, performance of the network slices can hardly be ensured. In addition, when allocating network resources to the network slices of the different tenants, the network management device can determine only a rough resource deployment status based on the SLA templates. This may cause a problem of a resource waste or an insufficient deployment resource, thereby reducing performance of the network slices.

SUMMARY

Embodiments of this application provide a resource management method and apparatus, to resolve a other approaches problem that performance of a network slice is relatively low because a resource of the network slice is not properly deployed.

To achieve the foregoing objective, the following technical solutions are used in the embodiments of this application.

According to a first aspect, a resource management method is provided. The method includes obtaining, by a data analytics function network element, a first service experience data set of a service, where each piece of first service experience data in the first service experience data set is used to indicate service quality of all users or a plurality of users in a network, wherein the service is executed by the users, and the service is run in the network, obtaining, by the data analytics function network element, information about a first service quality requirement of the service, where the information about the first service quality requirement indicates a requirement on the first service experience data, and determining, by the data analytics function network element, a second network data set of the network based on the first service experience data set, a first network data set of the network, and the information about the first service quality requirement, where each piece of first network data in the first network data set includes a first performance parameter of the network, each piece of second network data in the second network data set includes a second performance parameter of the network, and when the network is in a state corresponding to the second network data, the service can satisfy the information about the first service quality requirement. In the foregoing technical solution, the data analytics function network element obtains, through analytics based on a large amount of first historical service experience data and a large quantity of historical network performance parameters, a relationship between first service experience data and a network performance parameter, and determines, based on the relationship, a setting that is of a network performance parameter and that corresponds to the first service quality requirement. That is, a big data analytics method is used to obtain the setting of the network performance parameter through analytics, to satisfy a requirement, provided by a network tenant or a service server, on overall experience of the service.

In a possible implementation of the first aspect, the network is a network slice, a network slice instance, or a network slice subnet instance. In the foregoing possible implementation, the data analytics function network element may obtain, through analytics using the big data analytics method, a setting of a performance parameter of the slice network, the slice instance network, or the slice subnet instance network, to satisfy a requirement, provided by a slice network tenant, a slice instance network tenant, a slice subnet instance network tenant, or the service server, on the overall experience of the service.

In a possible implementation of the first aspect, the data analytics function network element is a network data analytics device or a network management device. In the foregoing possible implementation, a data analytics function related to implementation of the present disclosure may be set in different network devices.

In a possible implementation of the first aspect, when the data analytics function network element is the network data analytics device, the method further includes sending, by the data analytics function network element, the second network data set to the network management device or a network repository device such that the network management device or the network repository device adjusts or sets the network based on the second network data set. In the foregoing possible implementation, different network devices trigger network adjustment or setting based on the second network data set.

In a possible implementation of the first aspect, obtaining, by the data analytics function network element, information about a first service quality requirement of the service includes obtaining, by the data analytics function network element, the information about the first service quality requirement of the service from a service server of the service.

In a possible implementation of the first aspect, the method further includes obtaining, by the data analytics function network element, the first network data set from the network management device or the network repository device.

In a possible implementation of the first aspect, obtaining, by a data analytics function network element, a first service experience data set of a service includes obtaining, by the data analytics function network element, a second service experience data set of the service, where each piece of second service experience data in the second service experience data set is used to indicate service quality, corresponding to a single user, of the service, and obtaining, by the data analytics function network element, the first service experience data set of the service based on the second service experience data set. In the foregoing possible implementation, the data analytics function network element calculates overall service experience data of the service based on user-level experience data, to help improve credibility of the obtained overall service experience data.

In a possible implementation of the first aspect, before obtaining, by the data analytics function network element, a second service experience data set of the service, the method further includes obtaining, by the data analytics function network element, a third service experience data set of the service, where each piece of third service experience data in the third service experience data set is used to indicate service experience, corresponding to the single user, of the service, and obtaining, by the data analytics function network element, a third network data set, corresponding to the third service experience data set, of the network, where each piece of third network data in the third network data set includes flow-level network data corresponding to the service, where obtaining, by the data analytics function network element, a second service experience data set of the service includes obtaining, by the data analytics function network element, the second service experience data set based on the third service experience data set and the third network data set. In the foregoing possible implementation, the data analytics function network element obtains a relationship between user-level service experience and flow-level network data based on a large amount of historical user-level service experience data and a large amount of corresponding historical flow-level network data, and calculates or infers current or future user-level service experience data based on the relationship.

In a possible implementation of the first aspect, obtaining, by the data analytics function network element, a second service experience data set of the service includes obtaining, by the data analytics function network element, the second service experience data set from the service server. In the foregoing possible implementation, user-level experience data is directly obtained from the service server such that method execution efficiency can be improved to some extent.

In a possible implementation of the first aspect, obtaining, by a data analytics function network element, a first service experience data set of a service includes obtaining, by the data analytics function network element, the first service experience data set from the service server of the service. In the foregoing possible implementation, overall experience data of the service is directly obtained from the service server such that method execution efficiency can be improved to some extent.

In a possible implementation of the first aspect, when the data analytics function network element is the network management device, the method further includes adjusting or setting, by the data analytics function network element, the network based on the second network data set. In the foregoing possible implementation, a setting of a network performance parameter is adjusted or set based on a statistical result of big data analytics, to help improve properness of network setting and adjustment, thereby improving service experience of the service running in the network.

In a possible implementation of the first aspect, obtaining, by a data analytics function network element, a first service experience data set of a service includes obtaining, by the data analytics function network element, the first service experience data set from the network data analytics device or a service server of the service.

In a possible implementation of the first aspect, each piece of first service experience data in the first service experience data set includes at least one of the following information: service identification information of the service, network identification information of the network, first time information, first location information, and proportion information of a quantity of users whose service experience satisfies a requirement.

In a possible implementation of the first aspect, each piece of second network data in the second network data set includes at least one of the following information: the identification information of the network, second time information, second location information, network device information, network interface information, and end-to-end performance information of the network.

In a possible implementation of the first aspect, the network device information includes at least one of the following information of at least one network device: identification information of the device, information about a quantity of registered subscribers, information about a quantity of online users, resource information, performance parameter measurement information, key performance indicator information, and association identification information, in the device, of a single user who executes the service.

In a possible implementation of the first aspect, the network interface information includes at least one of the following information of at least one network interface: identification information of a device corresponding to the network interface, latency information of the network interface, topology information of the device corresponding to the network interface, data packet throughput information of the network interface, and link usage information of the network interface.

In a possible implementation of the first aspect, each piece of second service experience data in the second service experience data set includes at least one of the following information: identification information of a user, association identification information of the user, service quality assessment data of the user, and service description information.

According to a second aspect, a resource management apparatus is provided. The apparatus includes an obtaining unit configured to obtain a first service experience data set of a service, where each piece of first service experience data in the first service experience data set is used to indicate service quality of all users or a plurality of users in a network, wherein the service is executed by the users, and the service is run in the network, where the obtaining unit is further configured to obtain information about a first service quality requirement of the service, where the information about the first service quality requirement indicates a requirement on the first service experience data, and a processing unit configured to determine a second network data set of the network based on the first service experience data set, a first network data set of the network, and the information about the first service quality requirement, where each piece of first network data in the first network data set includes a first performance parameter of the network, each piece of second network data in the second network data set includes a second performance parameter of the network, and when the network is in a state corresponding to the second network data, the service can satisfy the information about the first service quality requirement.

In a possible implementation of the second aspect, the network is a network slice, a network slice instance, or a network slice subnet instance.

In a possible implementation of the second aspect, the resource management apparatus includes a network data analytics device or a network management device.

In a possible implementation of the second aspect, when the resource management apparatus is the network data analytics device, the apparatus further includes a sending unit configured to send the second network data set to the network management device or a network repository device such that the network management device or the network repository device adjusts or sets the network based on the second network data set.

In a possible implementation of the second aspect, the obtaining unit is further configured to obtain the information about the first service quality requirement of the service from a service server of the service.

In a possible implementation of the second aspect, the obtaining unit is further configured to obtain the first network data set from the network management device or the network repository device.

In a possible implementation of the second aspect, the obtaining unit is further configured to obtain a second service experience data set of the service, where each piece of second service experience data in the second service experience data set is used to indicate service quality, corresponding to a single user, of the service, and obtain the first service experience data set of the service based on the second service experience data set.

In a possible implementation of the second aspect, the obtaining unit is further configured to obtain a third service experience data set of the service, where each piece of third service experience data in the third service experience data set is used to indicate service experience, corresponding to the single user, of the service, and obtain a third network data set, corresponding to the third service experience data set, of the network, where each piece of third network data in the third network data set includes flow-level network data corresponding to the service, where that the obtaining unit is further configured to obtain a second service experience data set of the service includes obtaining the second service experience data set based on the third service experience data set and the third network data set.

In a possible implementation of the second aspect, the obtaining unit is further configured to obtain the second service experience data set from the service server of the service.

In a possible implementation of the second aspect, the obtaining unit is further configured to obtain the first service experience data set from the service server of the service.

In a possible implementation of the second aspect, when the resource management apparatus is the network management device, the processing unit is further configured to adjust or set the network based on the second network data set.

In a possible implementation of the second aspect, the obtaining unit is further configured to obtain the first service experience data set from the network data analytics device or a service server of the service.

In a possible implementation of the second aspect, each piece of first service experience data in the first service experience data set includes at least one of the following information: service identification information of the service, network identification information of the network, first time information, first location information, and proportion information of a quantity of users whose service experience satisfies a requirement.

In a possible implementation of the second aspect, each piece of second network data in the second network data set includes at least one of the following information: the identification information of the network, second time information, second location information, network device information, network interface information, and end-to-end performance information of the network.

In a possible implementation of the second aspect, the network device information includes at least one of the following information of at least one network device: identification information of the device, information about a quantity of registered subscribers, information about a quantity of online users, resource information, performance parameter measurement information, key performance indicator information, and association identification information, in the device, of a single user who executes the service.

In a possible implementation of the second aspect, the network interface information includes at least one of the following information of at least one network interface: identification information of a device corresponding to the network interface, latency information of the network interface, topology information of the device corresponding to the network interface, data packet throughput information of the network interface, and link usage information of the network interface.

In a possible implementation of the second aspect, each piece of second service experience data in the second service experience data set includes at least one of the following information: identification information of a user, association identification information of the user, service quality assessment data of the user, and service description information.

According to a third aspect, a data analytics function network element is provided. The data analytics function network element includes a processor, a memory, a communications interface, and a bus. The processor, the memory, and the communications interface are connected using the bus. The memory is configured to store program code. The communications interface is configured to support communication of the data analytics function network element. When the program code is executed by the processor, the data analytics function network element is enabled to perform the steps in the resource management method according to any one of the first aspect or the possible implementations of the first aspect.

According to a fourth aspect, a service monitoring method is provided. The method includes obtaining, by a data analytics function network element, a third service experience data set of a service from a service server of the service, where each piece of third service experience data in the third service experience data set is used to indicate service quality, corresponding to a single user, of the service, obtaining a third network data set, corresponding to the third service experience data set, of a network, where each piece of third network data in the third network data set includes flow-level network data corresponding to the service, and determining second service experience data based on the third service experience data set and the third network data set.

In a possible implementation of the fourth aspect, determining second service experience data based on the third service experience data set and the third network data set includes obtaining a fourth network data set, and determining the second service experience data based on the third service experience data set, the third network data set, and the fourth network data set.

In a possible implementation of the fourth aspect, the method further includes determining a service experience model of the service based on the third service experience data set and the third network data set, where the service experience model is used to represent a relationship indicating variation of service experience data of the service along with network data corresponding to the service, and determining the second service experience data based on the service experience model.

In a possible implementation of the fourth aspect, each piece of third service experience data in the third service experience data set includes at least one of the following information: identification information of a user, association identification information of the user, service quality assessment data of the user, and service description information.

According to a fifth aspect, a service monitoring apparatus is provided. The apparatus includes an obtaining unit configured to obtain a third service experience data set of a service from a service server of the service, where each piece of third service experience data in the third service experience data set is used to indicate service quality, corresponding to a single user, of the service, where the obtaining unit is further configured to obtain a third network data set, corresponding to the third service experience data set, of the network, where each piece of third network data in the third network data set includes flow-level network data corresponding to the service, and a processing unit configured to determine second service experience data based on the third service experience data set and the third network data set.

In a possible implementation of the fifth aspect, the obtaining unit is further configured to obtain fourth network data. The second service experience data is determined based on the third service experience data set, the third network data set, and the fourth network data.

In a possible implementation of the fifth aspect, the processing unit is further configured to determine a service experience model of the service based on the third service experience data set and the third network data set, where the service experience model is used to represent a relationship indicating variation of service experience data of the service along with network data corresponding to the service, and determine the second service experience data based on the service experience model.

In a possible implementation of the fifth aspect, first service experience data set includes at least one of the following information: identification information of a user, association identification information of the user, service quality assessment data of the user, and service description information.

According to a sixth aspect, a data analytics function network element is provided. The data analytics function network element includes a processor, a memory, a communications interface, and a bus. The processor, the memory, and the communications interface are connected using the bus. The memory is configured to store program code. The communications interface is configured to support communication of the data analytics function network element. When the program code is executed by the processor, the data analytics function network element is enabled to perform the steps in the service monitoring method according to any one of the fourth aspect or the possible implementations of the fourth aspect.

According to another aspect of this application, a communications system is provided. The communications system includes a data analytics function network element and a service server. The data analytics function network element is a data analytics function network element according to any one of the second aspect or the possible implementations of the second aspect.

According to another aspect of this application, a computer-readable storage medium is provided. The computer-readable storage medium stores an instruction. When the instruction is run on a computer, the computer is enabled to perform steps in the resource management method according to any one of the first aspect or the possible implementations of the first aspect.

According to another aspect of this application, a computer-readable storage medium is provided. The computer-readable storage medium stores an instruction. When the instruction is run on a computer, the computer is enabled to perform steps in the service monitoring method according to any one of the fourth aspect or the possible implementations of the fourth aspect.

According to another aspect of this application, a computer program product including an instruction is provided. When the computer program product runs on a computer, the computer is enabled to perform steps in the resource management method according to any one of the first aspect or the possible implementations of the first aspect.

According to another aspect of this application, a computer program product including an instruction is provided. When the computer program product runs on a computer, the computer is enabled to perform steps in the service monitoring method according to any one of the fourth aspect or the possible implementations of the fourth aspect.

According to another aspect of this application, a chip system is provided. The chip system includes a memory, a processor, a bus, and a communications interface. The memory stores code and data. The processor is connected to the memory using the bus. The processor runs the code in the memory, to enable the chip system to perform steps in the resource management method according to any one of the first aspect or the possible implementations of the first aspect.

According to another aspect of this application, a chip system is provided. The chip system includes a memory, a processor, a bus, and a communications interface. The memory stores code and data. The processor is connected to the memory using the bus. The processor runs the code in the memory, to enable the chip system to perform steps in the service monitoring method according to any one of the fourth aspect or the possible implementations of the fourth aspect.

It may be understood that the resource management apparatus, any computer storage medium, or any computer program product that is provided above is configured to perform the corresponding method provided above. Therefore, for beneficial effects of the resource management apparatus, the computer storage medium, or the computer program product, refer to the beneficial effects in the corresponding method provided above. Details are not described herein again.

The embodiments of the present disclosure further provide a resource management method and apparatus.

According to another aspect, an embodiment of this application provides a resource management method. The method includes determining, by a first network element, a status reflecting how a network satisfies a network quality requirement, and sending, by the first network element, first indication information to a network management device, where the first indication information is used to indicate the status reflecting how the network satisfies the network quality requirement.

According to the foregoing method, the first network element can trigger, based on the status reflecting how the network satisfies the network quality requirement and determined by the first network element, a network management network element to adjust a network resource. That is, a serial method in which the first network element and the network management network element adjust the network resource is provided.

In a possible design, before sending, by the first network element, first indication information to a network management device, the method further includes controlling, by the first network element, an access user quantity in the network.

In a possible design, controlling, by the first network element, an access user quantity in the network includes receiving, by the first network element, information about a user quantity from the network management device or a network data analytics device, where the information about the user quantity includes information about a registered subscriber quantity and/or information about an online user quantity, and controlling, by the first network element, the access user quantity in the network based on the information about the user quantity.

In a possible design, the status reflecting how the network satisfies the network quality requirement includes: the network cannot satisfy the network quality requirement, the status reflecting how the network satisfies the network quality requirement is less than a preset value, or a degree to which the network satisfies the network quality requirement.

In a possible design, determining, by a first network element, a status reflecting how a network satisfies a network quality requirement includes receiving, by the first network element, first network experience data of the network from the network data analytics device, where the first network experience data is used to indicate network service quality, and determining, by the first network element based on the first network experience data, the status reflecting how the network satisfies the network quality requirement.

According to another aspect, this application further discloses a resource management method. The method includes receiving, by a network management device, first indication information from a first network element, where the first indication information is used to indicate a status reflecting how a network satisfies a network quality requirement, and adjusting, by the network management device, a network resource based on the first indication information.

According to the foregoing method, the network management network element can adjust the network resource based on a trigger condition sent by the first network element, where the trigger condition is the status reflecting how the network satisfies the network quality requirement and determined by the first network element. That is, a serial method in which the first network element and the network management network element adjust the network resource is provided.

In a possible design, adjusting, by the network management device, a network resource based on the first indication information includes determining, by the network management device based on the first indication information, that the network cannot satisfy the network quality requirement, and adjusting, by the network management device, the network resource.

In a possible design, adjusting, by the network management device, a network resource based on the first indication information includes receiving, by the network management device, second network experience data from a network data analytics device, where the second network experience data is used to indicate network service quality, and adjusting, by the network management device, the network resource based on the first indication information and the second network experience data.

In a possible design, the method includes obtaining, by the network management device, the second network experience data based on the first indication information.

According to another aspect, this application further discloses a resource management method. The method includes receiving, by a network management device, network experience data from a network data analytics device, where the network experience data is used to indicate network service quality, and adjusting, by the network management device, a network resource based on the network experience data.

According to the foregoing method, the network management device adjusts or sets a network based on network quality analytics information provided by the network data analytics device such that network setting properness and accuracy can be better provided.

In a possible design, the network experience data includes experience data of a network granularity and/or experience data of a service granularity, the experience data of the network granularity is used to indicate network service quality of the network granularity, and the experience data of the service granularity is used to indicate network service quality of the service granularity.

In a possible design, the method further includes receiving, by the network management device, first indication information from a first network element, where the first indication information is used to indicate a status reflecting how the network satisfies a network quality requirement.

In a possible design, the status reflecting how the network satisfies the network quality requirement includes: the network cannot satisfy the network quality requirement, the status reflecting how the network satisfies the network quality requirement is less than a preset value, or a degree to which the network satisfies the network quality requirement.

In a possible design, adjusting, by the network management device, a network resource based on the network experience data includes adjusting, by the network management device, the network resource based on the first indication information and the network experience data.

In a possible design, adjusting, by the network management device, the network resource based on the first indication information and the network experience data includes determining, by the network management device based on the first indication information, that the network cannot satisfy the network quality requirement, and adjusting, by the network management device, the network resource.

According to another aspect, this application further discloses a resource management method. The method includes determining, by a first network device, a network status of a network, where the network status includes a test state or a stable state, the test state is used to indicate that the network is a newly established network or the network is in a test phase, and the stable state is used to indicate that the network is in a stable state or the network completes the test phase, and sending, by the first network device, network status indication information to a second network device, where the network status indication information is used to indicate the network status of the network to the second network device, or the network status indication information is used to indicate, to the second network device, information about a time at which data is reported, and the information about the time at which the data is reported is determined by the first network device based on the network status.

According to the foregoing method, the first network device may exchange the network status with the second network device such that the second network device can use different data reporting policies based on different network statuses.

In a possible design, the method further includes receiving, by the first network device, the data from the second network device, where the data is sent by the second network device to the first network device based on the network status indication information.

In a possible design, the first network device includes a network management device.

In a possible design, the second network device includes a network data analytics device.

In a possible design, the data includes network experience data. The network experience data is used to indicate network service quality.

In a possible design, the method further includes adjusting, by the first network device, a network resource based on the network experience data such that the network can satisfy a network quality requirement.

In a possible design, adjusting, by the first network device, a network resource based on the network experience data includes sending, by the first network device, resource adjustment notification information to an access network device or a core network device based on the network experience data, where the resource adjustment notification information is used to notify the access network device or the core network device to adjust the network resource.

According to another aspect, this application further discloses a resource management method. The method includes receiving, by a second network device, network status indication information from a first network device, where the network status indication information is used to indicate a network status of a network to the second network device, or the network status indication information is used to indicate, to the second network device, information about a time at which data is reported, the network status includes a test state or a stable state, the test state is used to indicate that the network is a newly established network or the network is in a test phase, the stable state is used to indicate that the network is in a stable state or the network completes the test phase, and the information about the time at which the data is reported is determined by the first network device based on the network status, and sending, by the second network device, the data to the first network device based on the network status indication information.

According to the foregoing method, the first network device may exchange the network status with the second network device such that the second network device can use different data reporting policies based on different network statuses.

In a possible design, the method further includes obtaining, by the second network device, training data from a third network device based on the network status indication information, where the third network device is different from the second network device, and generating, by the second network device, the data based on the training data.

In a possible design, the first network device includes a network management device.

In a possible design, the second network device includes a network data analytics device.

In a possible design, the data includes network experience data. The network experience data is used to indicate network service quality.

According to another aspect, an embodiment of this application provides a resource management apparatus. The apparatus has a function of implementing behavior of the first network element in the foregoing method. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing method. The transceiver is configured to implement communication between the foregoing apparatus and a network management device/network data analytics device. The apparatus may further include a memory. The memory is configured to be coupled to the processor, and stores a program instruction and data that are necessary for the apparatus.

According to another aspect, an embodiment of this application provides a resource management apparatus. The apparatus has a function of implementing behavior of the network management device in the foregoing method. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing method. The transceiver is configured to implement communication between the foregoing apparatus and a network data analytics device/first network element. The apparatus may further include a memory. The memory is configured to be coupled to the processor, and stores a program instruction and data that are necessary for the apparatus.

According to another aspect, an embodiment of this application provides a resource management apparatus. The apparatus has a function of implementing behavior of the first network device in the foregoing method. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing method. The transceiver is configured to implement communication between the foregoing apparatus and a second network device/network data analytics device. The apparatus may further include a memory. The memory is configured to be coupled to the processor, and stores a program instruction and data that are necessary for the apparatus.

According to another aspect, an embodiment of this application provides a resource management apparatus. The apparatus has a function of implementing behavior of the second network device in the foregoing method. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing method. The transceiver is configured to implement communication between the foregoing apparatus and a first network device. The apparatus may further include a memory. The memory is configured to be coupled to the processor, and stores a program instruction and data that are necessary for the apparatus.

According to another aspect, an embodiment of this application provides a computer-readable storage medium. The computer-readable storage medium stores an instruction. When the instruction is run on a computer, the computer is enabled to perform the methods in the foregoing aspects.

According to another aspect, an embodiment of this application provides a computer program product including an instruction. When the computer program product runs on a computer, the computer is enabled to perform the methods in the foregoing aspects.

According to another aspect, this application provides a chip system. The chip system includes a processor configured to support the foregoing apparatus in implementing a function in the foregoing aspects, for example, generating or processing information in the foregoing methods. In a possible design, the chip system further includes a memory. The memory is configured to store a program instruction and data that are necessary for a resource management apparatus. The chip system may include a chip, or may include a chip and another discrete device.

DESCRIPTION OF EMBODIMENTS

Figure 1:
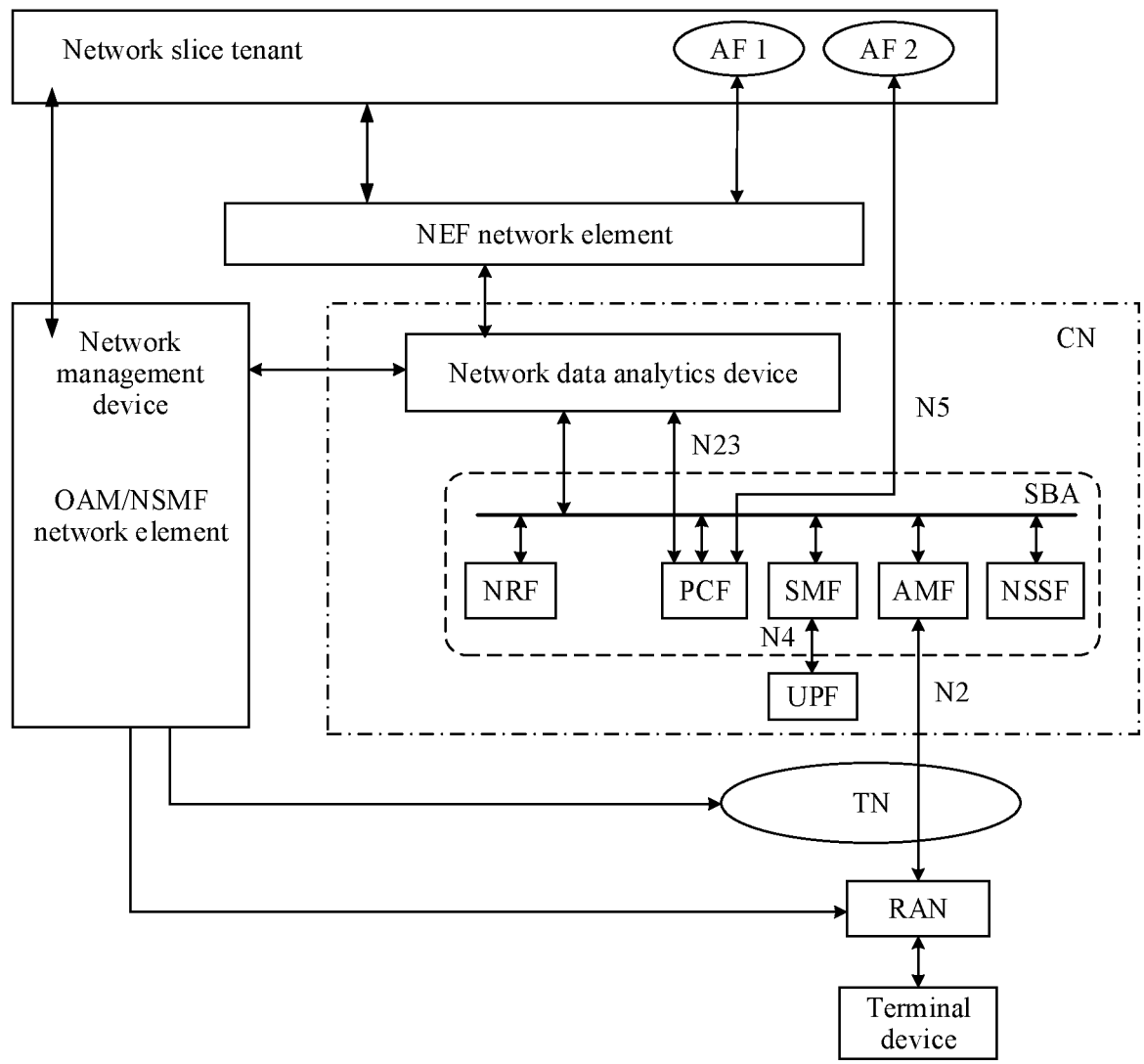
FIG. 1 is a schematic structural diagram of a communications system according to an embodiment of this application.

In this application, "at least one" refers to one or more, and "a plurality of" refers to two or more. The term "and/or" describes an association relationship between associated objects and represents that three relationships may exist. For example, A and/or B may represent the following three cases: only A exists, both A and B exist, and only B exists. A and B may be in a singular or plural form. The character "/" generally indicates an "or" relationship between the associated objects. "At least one of the following" or a similar expression thereof indicates any combination of the following, and includes any combination of one or more of the following. For example, at least one of a, b, or c may indicate a, b, c, a-b, a-c, b-c, or a-b-c, where a, b, and c may be in a singular or plural form. In addition, in embodiments of this application, words such as "first" and "second" do not limit a quantity and an execution sequence.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" is intended to present a relative concept in a specific manner.

First, to facilitate understanding of the embodiments of this application, some technical terms in the embodiments of this application are described.

An NS may also be referred to as a slice network, may also be referred to as a slice for short, and refers to a logical network customized based on service requirements of services of different tenants (tenant) on a physical or virtualized network infrastructure. The network slice may be a complete end-to-end network that includes a terminal device, an access network, a transport network, a core network, and a service server, or may be a complete end-to-end network that includes only a core network but is assisted by a terminal device, an access network, a transport network, and a service server, can provide a complete communications service, and has a network capability. The network slice may be a communications resource that ensures that a bearer service or a service can satisfy an SLA requirement, or may be considered as a combination of a network function and a communications resource that are required to complete a communications service or some communications services. A network slice is identified using single network slice selection assistance information (S-NSSAI). The S-NSSAI includes a slice/service type (SST) and a slice differentiator (SD). The SST and the SD may be defined in a standard or customized by a carrier. The SD is optional information for supplementing the SST, to differentiate between a plurality of network slices of a same SST, and for example, may be used to represent home relationships of the network slices.

A network slice instance (NSI) may also be referred to as a slice instance network, is an instantiated network that is created by the carrier on an infrastructure based on a network slice template, and is formed by integrating different network function entities and physical resources. Different network slice instances are logically isolated from each other. One or more NSIs may be obtained through instantiation of one network slice, and each NSI is identified using an NSI identifier (ID). That is, one piece of S-NSSAI corresponds to one or more NSI IDs.

A network slice subnet instance (NSSI) may also be referred to as a slice subnet instance network. A group of network function network elements and resources of the function network elements are orchestrated and configured to form a local logical network. The network slice subnet instance is introduced mainly to facilitate management of a network slice instance. For example, a network slice instance is divided into two network slice subnet instances based on a core network element and an access network element, to separately orchestrate and configure core network resources and network resources, thereby facilitating management.

An SLA is a contract between a service provider and a customer of the service provider, is used to record an application service provided by the service provider, and defines performance criteria that the service provider has an obligation to satisfy. The SLA may arouse expectations of the customer for the service provider in terms of fulfillment and quality. The SLA may include a series of qualitative or quantitative rules such as availability, a performance indicator baseline, reliability, and a response time.

The following describes the technical solutions in the embodiments of this application with reference to the accompanying drawings in the embodiments of this application.

FIG. 1 is a schematic architectural diagram of a communications system according to an embodiment of this application. The communications system includes a network data analytics device, application function (AF) network elements, a core network (CN) network element, a radio access network (RAN) access network (AN) network element, a transmission network element (TN), a network management device, a terminal device, and a network exposure function (NEF) network element. In FIG. 1, an example in which the AF network elements include an AF 1 and an AF 2 is used for description. In this embodiment of this application, a data analytics function related to this application may be deployed in the network data analytics device, or may be deployed in the network management device. That is, a data analytics function network element may be the network data analytics device or the network management device. During actual application, the data analytics function network element may alternatively be another network element.

The core network element may include a policy control function (PCF) network element, a session management function (SMF) network element, an access and mobility management function (AMF) network element, and a user plane function (UPF) network element, and a network repository function (NRF) network element. The network management device may include a network operation administration and maintenance (OAM) network element, a network slice management function (NSMF) network element, and the like.

The network data analytics device (for example, a network data analytics function (NWDAF)) may be deployed inside a core network. That is, the network data analytics device also belongs to a core network element. Alternatively, the network data analytics device may not be deployed inside a core network. This is not limited in this embodiment of this application. In addition, the network data analytics device and the network management device may be separately deployed, or may be integrated with another network element in a network. This is not limited in this application. In FIG. 1, an example in which the network data analytics device and the network management device are separately deployed is used for description.

In addition, the network data analytics device may directly communicate, through a service-oriented interface, with a network element with which the network data analytics device needs to communicate. For example, the network data analytics device may communicate with network elements such as the PCF network element, the SMF network element, the AMF network element, the UPF network element, the NRF network element, and the RAN network element by invoking different services of the service-oriented interface through the service-oriented interface. It may be understood that, in the communications system shown in FIG. 1, functions and interfaces of the network elements are merely examples. When the network elements are used in this embodiment of this application, not all functions are necessary. In addition, this application does not exclude that the network elements communicate with each other based on a point-to-point interface. For example, the network data analytics device is connected to the PCF network element through an N23 interface. The PCF network element is connected to the AF network element through an N5 interface, is connected to the SMF network element through an N7 interface, and is connected to the AMF network element through an N15 interface. The PCF may dynamically formulate a quality of service (QoS) policy, and distribute a corresponding policy to network elements such as the SMF network element and the AMF network element. The UPF is connected to the SMF network element through an N4 interface, and is connected to the RAN network element through an N3 interface. The AN is connected to the AMF network element through an N2 interface. UE is connected to the AMF network element through an N1 interface. FIG. 1 shows only a part of the interfaces listed above.

The terminal device includes but is not limited to user equipment (UE), a subscriber unit, a subscriber station, a mobile station, a mobile station, a remote station, a remote terminal device, a mobile terminal device, a user terminal device, a wireless communications device, a user agent, a user apparatus, a cellular phone, a cordless phone, a Session Initiation Protocol (SIP) phone, a wireless local loop (WLL) station, a personal digital assistant (PDA), a handheld device with a wireless communication function, a computing device, a processing device connected to a wireless modem, a vehicle-mounted device, a wearable device, a terminal device in an internet of things, a household appliance, a virtualized reality device, a terminal device in a 5G network, or a future evolved public land mobile network (PLMN), or the like.

A tenant is a customer that leases an exchange carrier network and uses the network to provide one or more services for a user of the tenant. The tenant may be a tenant from a vertical industry, a tenant from an over-the-top (OTT) industry, or another third-party tenant. In addition, the carrier network leased by the tenant may be a network slice, a slice network instance in a slice network, or another type of network. This is not limited in the embodiments of this application.

The application function network element is a server side that provides a service of a type for a user. Therefore, the application function network element may also be referred to as an application server or a service server.

The access network element may be a network element that communicates with the terminal device. The access network element may provide communication coverage for a specific geographical area, and may communicate with a terminal device within the coverage area (cell). The access network element may communicate with any quantity of terminal devices. There may be a plurality of air interface connections between the access network element and the terminal device. For example, there are two air interface connections between the access network element and the terminal device, and the two air interface connections are respectively used to transmit a data flow A and a data flow B. The access network element may support communications protocols in different standards, or may support different communication patterns. For example, the access network element may be a 5G base station or a next-generation NodeB (gNB), an evolved NodeB (eNodeB), a WI-FI access point (AP), a Worldwide Interoperability for Microwave Access (WIMAX) base station (BS), or a radio controller in a cloud radio access network (CRAN). Alternatively, the network device may be an access network device or the like in the future evolved PLMN.

The PCF network element has a policy control decision function, and provides a policy for a network. The AMF network element is configured to perform mobility management, lawful interception, access authorization and authentication, and the like. The SMF network element is configured to implement session and bearer management, address assignment, and the like. The user plane function network element is configured to perform functions such as routing and forwarding of user plane data, threshold control, traffic monitoring, and verification. The network repository function network element is configured to provide a service discovery function or a network element discovery function, and a function of maintaining a feature of a network element and a service supported by the network element.

The transmission network element has a function of transmitting network data. For example, the transmission network element may be a routing forwarder.

The network operation, administration, and maintenance (OAM) network element has a network management function, including deployment and setting of a network (for example, a network slice or a network slice instance), measurement and statistics of device-level or network-level performance parameters, fault monitoring, fault complaint, fault locating, fault remediation, and the like.

The network data analytics device has a data statistics and analytics function, and may be configured to collect and analyze related data from a network element, a third-party service server, the terminal device, or a network management system, and provide a data analytics result for the network element, the third-party service server, the terminal device, or the network management system based on the related data. The analytics result may assist a network in selecting a quality of service parameter of a service, assist a network in performing traffic routing, assist a network in selecting a background traffic transmission policy, or the like. In this embodiment of this application, the network data analytics device may be further configured to provide a network (for example, network slice or network slice instance) analytics result such that the network executes a network (for example, network slice or network slice instance) deployment or adjustment policy based on the analytics result.

The network exposure function (NEF) network element has a function of providing or exposing a function of a carrier network to an external server or an external device, and serves as an intermediate medium for communication between internal and external networks. For example, when a third-party untrusted service server needs to communicate with an internal network, forwarding and processing operations of the network exposure function network element need to be performed. Certainly, if a service server inside a network or a third-party trusted service server communicates with the internal network, the network exposure function network element may not be required.

In this embodiment of this application, an access network device and all or some network elements in the core network may belong to a 3rd Generation Partnership Project (3GPP) network, or may belong to a non-3GPP network such as an intranet. All or some network elements in the core network may be physical entity network elements, or may be virtualized network elements. This is not limited herein.

A network to which a resource management method provided in the embodiments of this application is applied may be a network slice (for example, a slice in a 5G network), a network slice instance in a network slice (for example, a network slice instance in a 5G network slice), a 4G network corresponding to a dedicated core network (DCN), or a network of another granularity, for example, a network differentiated using a PLMN identity. This is not limited in the embodiments of this application.

Figure 2:
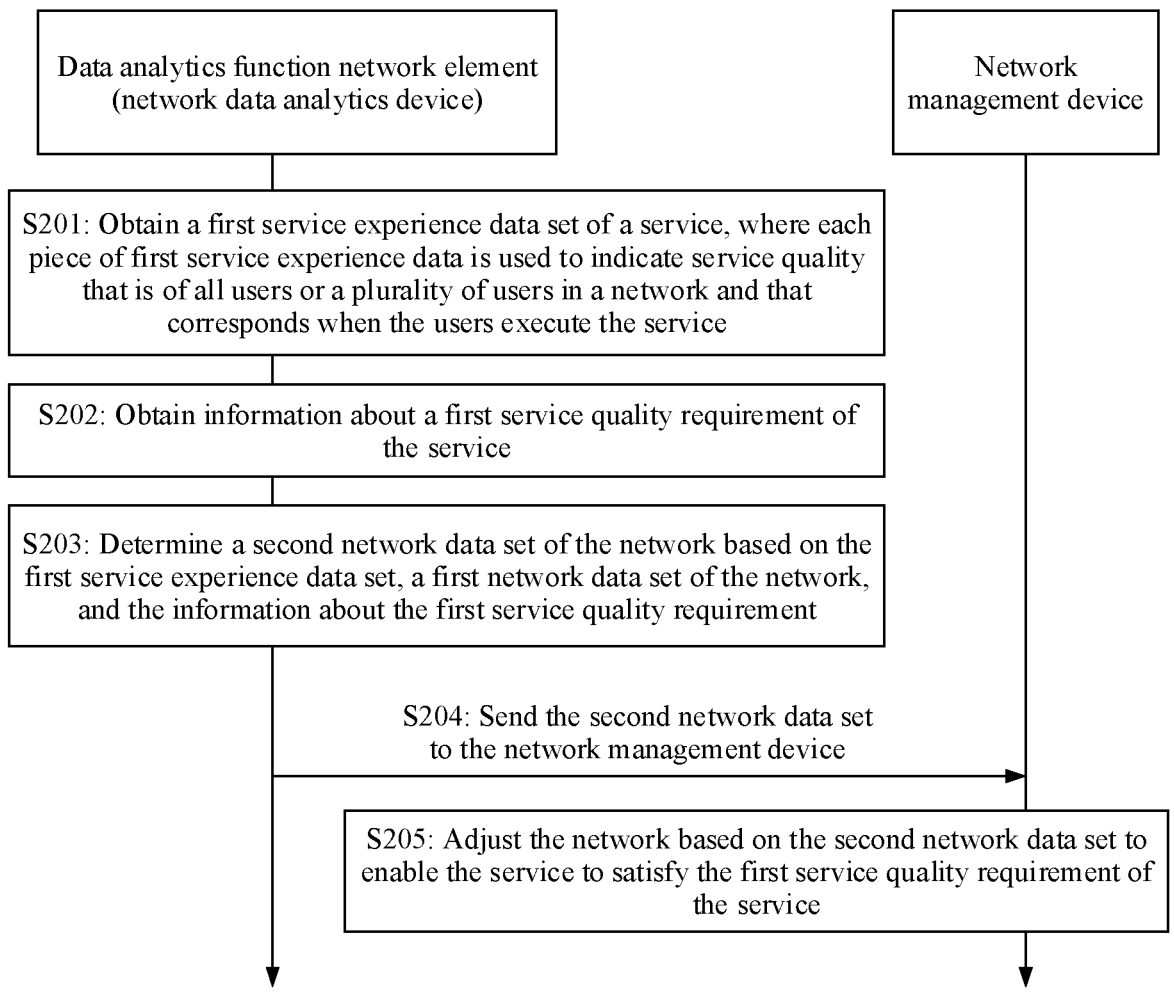
FIG. 2 is a schematic flowchart of a resource management method according to an embodiment of this application.

FIG. 2 is a schematic flowchart of a resource management method according to an embodiment of this application. Referring to FIG. 2, the method includes the following several steps.

S201: A network data analytics device obtains a first service experience data set of a service, where each piece of first service experience data in the first service experience data set is used to indicate service quality of all users or a plurality of users in a network, wherein the service is executed by the users, and the service is run in the network.

Each piece of first service experience data in the first service experience data set may include at least one of the following information: service identification information of the service, network identification information of the network, first time information, first location information, and proportion information of a quantity of users whose service experience satisfies a requirement. The service identification information of the service is used to uniquely identify the service. The network identification information of the network is used to uniquely identify the network and the network is a network in which the service is run. For example, when the network is a slice network or a slice instance network, the network identification information may be NSSAI, S-NSSAI, an NSI, or the like. The first time information is used to identify a time corresponding to the first service experience data. That is, the first service experience data is used to indicate service quality of all users or a plurality of users of the service within a first time. For example, the first time information is eight o'clock in the morning or eight o'clock in the morning to six o'clock in the afternoon. The first location information is used to identify a location corresponding to the first service experience data. That is, the first service experience data is used to indicate service quality of all users or a plurality of users at a first location, wherein the service is executed by the users. For example, the first location information is a serving cell A. The proportion information of the quantity of users whose service experience satisfies the requirement may refer to a proportion of users whose service quality satisfies the requirement and that are in a plurality of users who execute the service to the plurality of users. For example, the service is a voice service, the proportion information of the quantity of users whose service experience satisfies the requirement is a proportion of a quantity of users whose voice service mean opinion score (MOS) satisfies a requirement (for example, if a tenant requires that a MOS be greater than or equal to 3, that a MOS of a user is less than 3 means not meeting a requirement, and that a MOS of the user is greater than or equal to 3 means meeting the requirement). It is assumed that a total quantity of users executing the voice service is 100, and a quantity of users whose MOSs satisfy the requirement is 80. The proportion information of the quantity of users whose voice service experience satisfies the requirement is 80%.

For example, the service identification information of the service is a service_1, the network identification information is NSSAI_1, the first time information is eight o'clock in the morning, the first location information is the serving cell A, and the proportion information of the quantity of users whose service experience satisfies the requirement is 80%. In this case, a meaning of the first service experience data may be understood as follows. A network in which the service_1 is run is the NSSAI_1, the network NSSAI_1 covers the serving cell A, and assuming that a total quantity of users who execute the service_1 in the serving cell A is 100, service quality of 80 users satisfies the requirement and service quality of 20 users does not satisfy the requirement when 100 users execute the service at eight o'clock in the morning.

Optionally, the network data analytics device may obtain the first service experience data set of the service in the following three manners, which are shown as follows.

Manner 1: The network data analytics device obtains the first service experience data set of the service from a service server of the service.

In a running process of the service, the service server of the service may obtain second service experience data using a method of measuring and calculating by the service server. The second service experience data is used to indicate service quality, corresponding to a single user, of the service (for example, the service server may determine, according to the method of measuring and calculating by the service server, service quality that is of each single user and that corresponds when the single user executes the service). The service server of the service may further obtain information about a second service quality requirement of the service. The information about the second service quality requirement indicates a requirement on user-level service quality of the service (for example, a MOS of a voice service of the single user is required to be greater than 3). The service server determines one piece of first service experience data of the service based on a large amount of second service experience data and the information about the second service quality requirement. A plurality of pieces of first service experience data may be generated in a plurality of similar determining processes performed by the service server. The first service experience data set includes the plurality of pieces of first service experience data. For example, in a determining process, if the service server determines that voice service MOSs of 80 of 100 users are greater than 3, the service server determines that one piece of first service experience data is 80%. In another determining process, if the service server determines that voice service MOSs of 90 of 100 users are greater than 3, the service server determines that one piece of first service experience data is 90%. Similarly, after a plurality of determining processes, the service server may generate the first service experience data set.

The service server sends the first service experience data set of the service to the network data analytics device. For example, the service server of the service may actively send the first service experience data set of the service to the network data analytics device. Alternatively, the network data analytics device sends first request information to the service server, where the first request information is used to request to obtain the first service experience data set of the service. Therefore, when receiving the first request information, the service server may send the first service experience data set of the service to the network data analytics device.

Each piece of second service experience data is used to indicate the service quality, corresponding to the single user, of the service. Further, the service quality, corresponding to the single user, of the service includes but is not limited to service quality data that is of the service and that is of the user in a single service process, service quality data that is of the service and that is of the user in a time period, or service quality data that is of the service and that is of the user at a time point. The second service experience data and third service experience data below are used to differentiate service experience data in terms of a time sequence.

Each piece of second service experience data includes at least one of the following information: identification information of a user, association identification information of the user, service quality assessment data of the user, and service description information. The identification information of the user is used to uniquely identify the user. For example, the identification information of the user may be one or more of the following: an Internet Protocol (IP) address, a subscription permanent identifier (SUFI), a permanent equipment identifier (PEI), a generic public subscription identifier (GPSI), an international mobile subscriber identifier (IMSI), an international mobile equipment identity (IMEI), an IP 5-tuple, a mobile station international integrated services digital network number (MSISDN), and the like. The association identification information of the user is used to associate the second service experience data with flow-level network data (which may be referred to as fourth network data for differentiation herein) corresponding to the second service experience data. For example, the association identification information of the user may be an IP address of a user terminal used by the user or a temporary identifier allocated by a network to a single service flow of the user terminal. The temporary identifier may be allocated by a PCF network element, an NWDAF network element, an NRF network element, or another server network element to the service flow in a process of establishing the single service flow of the user. The allocated temporary identifier is distributed by the PCF network element, the NWDAF network element, the NRF network element, or another server network element in the service flow establishment process, to each network element corresponding to the service flow. The temporary identifier is used to associate various flow-level network data and user-level experience data that correspond to the service flow. The service quality assessment data of the user is data used to assess service quality of the user. For example, if the service is a voice service, the assessment data may be a MOS, voice fluency, or the like of a voice service of the user. The service description information may include one or more of the following information: a service identifier to which a service flow belongs, IP filtering information, a media bandwidth requirement, traffic routing information, a jitter buffer requirement, a media coding type requirement, a media coding rate requirement, a Transmission Control Protocol (TCP) congestion window requirement, a TCP receive window requirement, a buffer requirement, and a requirement on a value of at least one data type.

Optionally, each piece of second service experience data obtained by the service server of the service may include data obtained through normalization such that security of the user information can be ensured. The normalization herein refers to an operation of mapping a physical value of a parameter to fixed value space, for example, an operation of mapping a physical value of each feature to the fixed value space using a maximum/minimum value normalization method, a Z-Score normalization method, or the like.

In addition, the information about the second service quality requirement of the service is used to indicate a requirement on the second service experience data of the service, that is, a requirement of the tenant or the service server on service quality of each single user of the service, and may be provided by the tenant for the service server. The information about the second service quality requirement of the service may be included in an SLA. Certainly, the information about the second service quality requirement of the service may alternatively be configured in the service server. For example, the service is a voice service, and the information, provided by the tenant, about the second service quality requirement of the service is that a voice service MOS of each user is greater than or equal to 5.

It should be noted that a method or an algorithm used by the service server to determine the first service experience data set of the service based on a second service experience data set and the information about the second service quality requirement of the service and a type of the generated first service experience data set may be user-defined, and are not limited in this embodiment of this application.

Further, when obtaining the second service experience data set (that is, a set of user-level service experience data), the service server of the service may obtain a plurality of pieces of second service experience data based on a time dimension to form the second service experience data set, may obtain a plurality of pieces of second service experience data based on a spatial dimension to form the second service experience data set, or obtain a plurality of pieces of second service experience data based on a time dimension and a spatial dimension to form the second service experience data set. When obtaining the second service experience data set based on the time dimension, the service server of the service may obtain second service experience data of each user of the service at a time point (for example, eight o'clock in the morning), or obtain second service experience data of each user of the service in a time period (for example, eight o'clock in the morning to six o'clock in the afternoon). When obtaining the second service experience data set based on the spatial dimension, the service server of the service may obtain second service experience data of each user in an entire network in which the service is run, obtain second service experience data of each user in an area (for example, a latitude and longitude range, a registration area (RA), or a tracking area (TA)), or obtain second service experience data of each user at a location (for example, a cell or a latitude and longitude point). When obtaining the second service experience data set based on the time dimension and the spatial dimension, the service server of the service may obtain second service experience data of each user of the service at a time point or in a time period in space. For example, the service server of the service may obtain second service experience data of each user of the service in the serving cell A at eight o'clock in the morning, to form the second service experience data set, or obtain second service experience data of each user of the service in the serving cell A from eight o'clock in the morning to six o'clock in the afternoon, to form the second service experience data set. It should be noted that, when the service server obtains the second service experience data set based on the time dimension, the spatial dimension, or a combination of the time dimension and the spatial dimension, each piece of first service experience data obtained by the service server based on the second service experience data also has a feature of the time dimension, the spatial dimension, or the combination of the time dimension and the spatial dimension. For example, when the service server of the service may obtain the second service experience data of each user of the service in the serving cell A from eight o'clock in the morning to six o'clock in the afternoon, to form the second service experience data set, first network data obtained based on the second service experience data set is correspondingly service quality of a service executed by all users or a plurality of users in the serving cell A from eight o'clock in the morning to six o'clock in the afternoon.

Manner 2: The network data analytics device obtains a second service experience data set of the service from the service server, and obtains the first service experience data set of the service based on the second service experience data set.

In a running process of the service, the service server that provides the service may directly obtain user-level service experience data, that is, second service experience data. A plurality of pieces of second service experience data form the second service experience data set. The service server sends the second service experience data set to the network data analytics device. For example, the service server of the service may actively send the second service experience data set to the network data analytics device. Alternatively, the network data analytics device sends second request information to the service server, where the second request information is used to request to obtain the second service experience data set. Therefore, when receiving the second request information, the service server may send the second service experience data set to the network data analytics device.

In addition, that the network data analytics device obtains the first service experience data set of the service based on the second service experience data set includes obtaining, by the network data analytics device, information about a second service quality requirement from the service server of the service, where information about the second service quality requirement is a requirement on the second service experience data, that is, information about a user-level service quality requirement on the service, and determining the first service experience data set of the service based on a large amount of second service experience data and the information about the second service quality requirement. For example, the service server of the service determines whether second service experience data of each user at a location at a time point satisfies the user-level service quality requirement, thereby determining a proportion of a quantity of users whose services satisfy a requirement at the location at the time point.

It should be noted that the second service experience data set sent by the service server of the service to the network data analytics device may be the second service experience data set, that is, the plurality of pieces of second service experience data obtained based on the time dimension, the spatial dimension, or the combination of the time dimension and the spatial dimension, where the second service experience data set is obtained by the service server in the manner described in S201.

In addition, a method or an algorithm used when the network data analytics device determines the first service experience data set of the service based on the second service experience data set and the information about the second service quality requirement and a type of the generated first service experience data set may be user-defined, and are not limited in this embodiment of this application.

Manner 3: The network data analytics device obtains a third service experience data set of the service, and obtains, based on the third service experience data set, a third network data set corresponding to the third service experience data set, where each piece of third network data in the third network data set is flow-level network data corresponding to a piece of third service experience data in the third service experience data set, and obtains a plurality of pieces of second service experience data based on the third service experience data set and the third network data set, to form a second service experience data set.

Each piece of third service experience data is also used to indicate service quality, corresponding to a single user, of the service. In addition, specific content of the third service experience data is similar to content of the second service experience data, except that the third service experience data is earlier than the second service experience data in terms of the time sequence. That is, the third service experience data is historical service quality data of the single user, wherein the service is executed by the single user. For example, both the second service experience data and the third service experience data include a MOS and voice fluency of a user. Assuming that a MOS and voice fluency of a user in the third service experience data are obtained through sampling at eight o'clock in the morning, a MOS and voice fluency of a user in the second service experience data may be obtained through sampling at nine o'clock in the morning.

In addition, flow-level network data (for example, the fourth network data or the third network data), corresponding to user-level service experience data (for example, the second service experience data or the third service experience data) of the service, of the service is network flow data corresponding to a single service process of each user. A network flow herein may be further a QoS flow in a 5G network. The network flow data may include a QoS parameter provided by a network device for the single service process of the user, for example, a Guaranteed Flow Bit Rate (GFBR), a Maximum Flow Bit Rate (MFBR), an uplink (UL) or downlink (DL) maximum (MAX) packet loss rate (PLR), a packet delay budget (PDB), a packet error rate (PER), an average window size, or a maximum data burst volume. Historical flow-level network data (that is, the fourth network data), corresponding to each piece of second service experience data, of the service may be flow-level network data of the service within a sampling time corresponding to the second service experience data. Likewise, historical flow-level network data (that is, the third network data), corresponding to each piece of third service experience data, of the service may be flow-level network data of the service within a sampling time corresponding to the third service experience data.

Further, the network data analytics device may establish a single-user service experience model based on the third service experience data set and the third network data set, to be specific, establish a relationship between user-level experience data and flow-level network data of the service, and obtain the second service experience data based on the model relationship. The second service experience data set may include a plurality of pieces of second service experience data.

For example, first, the network data analytics device may obtain the single-user service experience model using the following two steps:

A. The network data analytics device obtains training data of the service, where the training data is correspondingly the third service experience data set and the third network data set.

The network data analytics device first separately collects data from network elements such as a service server (for example, an AF), an access network element (for example, a RAN), a user plane function network element (for example, a UPF), a terminal device (for example, UE), a mobility management function network element (for example, an AMF), a session management function network element (for example, an SMF), and a policy control function network element (for example, a PCF), and then associates the data of the network elements using information such as a service identifier, a service flow identifier, a terminal identifier, a identifier of a session to which a service flow belongs, an association identifier on each network element, and time, to obtain complete training data. The training data includes:

(1) a third service experience data set from the AF network element; and (2) other time-varying parameter data that affects the third service experience data, that is, the third network data set, including:

i. TCP congestion window data, TCP receive window data, jitter buffer data, media coding type data, coding rate data, buffer data, and data of at least one data type that are from the AF network element;

ii. flow bit rate data, packet loss rate data, latency data, radio channel quality data, and data of at least one data type that are from the RAN element;

iii. flow bit rate data, packet loss rate data, latency data, and data of at least one data type that are from the UPF network element;

iv. flow bit rate data, packet loss rate data, latency data, data of at least one data type, a TCP congestion window data, a TCP receive window data, jitter buffer data, media coding type data, coding rate data, buffer data, central processing unit (CPU) usage, and memory usage; and v. the like.

B. For example, the network data analytics device obtains a relational model of the third service experience data and the third network data, that is, the single-user service experience model, based on a linear regression method. The model is as follows:

$$h(x) = w_0 x_0 + w_1 x_1 + w_2 x_2 + w_3 x_3 + \ldots + w_D x_D. \quad (1)$$

In the formula (1), h(x) is third service experience data of a service, for example, a historical MOS value of a voice service of a user. $X=(x_1, x_2, x_3, \ldots, x_D)$ is an eigenvector. For example, $x_1$ represents a latency, $x_2$ represents a packet loss rate, $x_3$ represents a flow bit rate, ..., $x_D$ represents a TCP congestion window, and $x_0$ is a constant 1. $W=(w_1, w_2, w_3, \ldots, w_D)$ is a parameter vector, and is also referred to as a weight vector. $w_i$ represents a value of a weight of impact from an $i^{th}$ parameter on the third service experience data.

The foregoing linear regression is merely an example of a data analytics algorithm. The network data analytics device may obtain the single-user service experience model based on another algorithm. This is not limited in the present disclosure. Then, the network data analytics device infers or calculates the second service experience data based on the single-user service experience model obtained through training and the flow-level network data (that is, the fourth network data) corresponding to the second service experience data.

For example, if the network data analytics device has learned of the h(x) model, the network data analytics device may calculate, based on a specific value of the independent variable $X=(x_1, x_2, x_3, \ldots, x_D)$ at a subsequent time point, a specific value, corresponding to the subsequent time point, of h(x).

It should be noted that each piece of third network data or each piece of fourth network data may also include data obtained through normalization, and the like. This is not limited in this embodiment of this application.

S202: The network data analytics device obtains information about a first service quality requirement of the service. There may be no sequence between S202 and S201. In FIG. 2, an example in which S202 is after S201 is used for description.

The information about the first service quality requirement of the service indicates a requirement on the first service experience data, that is, a requirement of the service server or the tenant on the service quality of all the users or the plurality of users of the service, and may be provided by the tenant or the service server. The information about the first service quality requirement actually represents a requirement on overall experience of the service, and may be included in the SLA. For example, when the first service quality requirement is presented as a proportion of the quantity of users whose service experience satisfies a requirement, the first service quality requirement may be that the proportion of the quantity of users whose service experience satisfies the requirement is required to be greater than a preset value.

The network data analytics device may obtain the information about the first service quality requirement of the service from the service server of the service or a network tenant.

Optionally, the network data analytics device may separately obtain the information about the second service quality requirement or the information about the first service quality requirement from the service server or the network tenant. Alternatively, the network data analytics device may obtain both the information about the second service quality requirement and the information about the first service quality requirement from the service server or the network tenant. For example, the information about the second service quality requirement and the information about the first service quality requirement may be included in a same message or a same information element and obtained by the network data analytics device.

For example, the network data analytics device may be an NWDAF network element, the service server may be an AF network element. The AF may provide the information about the first service quality requirement of the service for the NWDAF using a Naf_ServiceDataCollection Response or Naf_ServiceDataCollectionSubscription_Notify operation initiated to the NWDAF.

S203: The network data analytics device determines a second network data set of the network based on the first service experience data set, a first network data set of the network, and the information about the first service quality requirement.

Each piece of first network data in the first network data set includes a first performance parameter of the network, each piece of second network data in the second network data set includes a second performance parameter of the network, and when the network is in a state corresponding to each piece of second network data, the service can satisfy the first service quality requirement. Each piece of first network data or each piece of second network data includes a device-level performance parameter, an interface-level performance parameter, and a network-level performance parameter. The network-level performance parameter may include an end-to-end performance parameter of the network. Parameter types included in the first network data and the second network data may be the same. "First" and "second" are used to differentiate between the first network data and the second network data in terms of the time sequence. A time corresponding to the first network data is earlier than a time corresponding to the second network data. That is, the first network data is historical data before the second network data. For example, if both the first network data and the second network data include end-to-end latency information of the network, and assuming that latency information in the first network data is used to indicate a latency of a slice network at eight o'clock in the morning, latency information in the second network data may be used to indicate a latency of the slice network at nine o'clock in the morning. For another example, assuming that latency information in the first network data is used to indicate a latency of a slice network at eight o'clock in the morning of the first day, latency information in the second network data may be used to indicate a latency of the slice network at eight o'clock in the morning of the second day. A main objective of step 203 is that the network data analytics device can obtain at least one piece of second network data through statistics and analytics based on a large amount of first historical network data and a large amount of first historical service experience data. When network data is set to be one of the at least one piece of second network data, a service in the network can satisfy the first service quality requirement of the service. That is, a method for setting a network performance parameter is sought according to the first service quality requirement.

It should be noted that, assuming that the network data analytics device obtains the first service experience data set and the corresponding first network data set based on the time dimension, the spatial dimension, or the time dimension and the spatial dimension, the second network data set obtained by the network data analytics device may also have the feature of the time dimension, the spatial dimension, the time dimension feature and the spatial dimension. For example, when the first service experience data set and the first network data set are the first service experience data set and the first network data set that correspond to the serving cell A from eight o'clock to nine o'clock in the morning, the second network data set obtained by the network data analytics device based on the first service experience data set and the first network data set is correspondingly at least one piece of second network data in the serving cell A from eight o'clock to nine o'clock in the morning.

For example, the first network data set of the network may be obtained by the network data analytics device from a network management device or a network repository device, or directly from each corresponding network device. The network management device may be the OAM network element or the NSMF network element shown in FIG. 1, and the network repository device may be the NRF network element shown in FIG. 1.

Each piece of first network data may include at least one of the following information: identification information of the network, third time information, third location information, network device information, network interface information, and end-to-end performance information of the network. The third time information is used to identify a time corresponding to each piece of first network data. That is, the first network data is used to indicate a set of performance parameters of the network within a third time. For example, the third time information is eight o'clock in the morning or eight o'clock in the morning to six o'clock in the afternoon. The third location information is used to identify a location corresponding to the first network data. That is, the first network data is used to indicate a set of performance parameters of the network at a third location. For example, the third location information is the serving cell A. The network device information is used to indicate performance parameter information of at least one network device included in the network, for example, performance parameter information of an AMF in the network and performance parameter information of an SMF in the network. The network interface information is used to indicate performance parameter information of at least one network interface in the network, for example, performance parameter information of an N3 interface and an N6 interface. The end-to-end performance information of the network is performance parameter information that is of an entire network level and that can be provided by the network.

The following separately describes in detail the network device information, the network interface information, and the end-to-end performance information of the network.

The network device information includes the performance parameter information of at least one network device in the network. Each piece of network device information may include at least one of the following information: identification information of the device, information about a quantity of registered subscribers, information about a quantity of online users, resource information, performance parameter measurement information, key performance indicator (KPI) information, and association identification information, in the device, of a single user who executes the service. The resource information herein may include but is not limited to at least one of the following information: a CPU resource, a storage resource, and a bandwidth resource. The CPU resource, the storage resource, and the bandwidth resource each may include a used resource and/or a remaining resource. It should be noted that resource information types of all network devices may be the same or may be different. For example, if a resource type of a base station may include only the bandwidth resource, resource information of the base station is bandwidth resource information. For another example, if a resource type of a UPF may be the storage resource, resource information of the UPF is storage resource information. Likewise, performance parameter types and KPI parameter types of all the network devices may also be the same or different. This is not limited in this application.

For example, if types of the network device in the network include a RAN, an AMF, an SMF, a UPF, and the like, each piece of first network data may include information about at least one RAN, at least one AMF, at least one SMF, at least one UPF, and the like. For ease of understanding, the RAN is used as an example herein for description. Information about the RAN may include at least one of the following information of the at least one RAN device: an identifier of the RAN, information about a quantity of registered subscribers included in the RAN, a quantity of online users in the RAN, resource information of the RAN, performance parameter measurement information of the RAN, KPI information of the RAN, association identification information (for example, an IP address of UE or an ID of UE) of at least one user who executes the service in the RAN.

It should be noted that network device information corresponding to network elements such as the AMF, the SMF, and the UPF included the network is similar to the information about the RAN. For details, refer to the foregoing descriptions. Details are not described herein again in this embodiment of this application.

In addition, the network interface information includes the performance parameter information of the at least one network interface. Each piece of network interface information may include at least one of the following information: device identification information of a device corresponding to the network interface and performance parameter information of the network interface. The performance parameter information of the network interface includes at least one of the following information: latency information of the network interface, topology information of the device corresponding to the network interface, data packet throughput information of the network interface, and link usage information of the network interface. Performance parameter types of all network interfaces may be the same or different. This is not limited in this application.

For example, if the network includes interfaces of types such as N2, N3, N6, and N9, the network interface information may include information about an interface such as at least one N2, at least one N3, at least one N6, or at least one N9. For ease of understanding, the N3 interface type is used as an example for description herein. Because the N3 is an interface between a UPF and a RAN, a piece of N3 interface information may include an identifier of the UPF and an identifier of the RAN on two sides of the N3 interface, latency information of the N3 interface, topology information between the UPF and the RAN that correspond to the N3 interface, data packet throughput information of the N3 interface, and link usage information of the N3 interface.

It should be noted that network interface information corresponding to another interface included in the network is similar to the network interface information corresponding to the N3 interface. For details, refer to the foregoing descriptions. Details are not described herein again in this embodiment of this application.

In addition, the end-to-end performance information of the network includes at least one of the following information: an end-to-end latency in the network, a quantity of registered subscribers of the service in the network, uplink data traffic, downlink data traffic, and a quantity of packet data unit (PDU) sessions in the network, virtualized resource usage information in the network, and the like.

For example, first network data of the 5G network, a network slice, a network slice instance, or a network slice subnet instance may include content shown in the following Table 1 to Table 3.

TABLE 1

Performance parameters and performance indicators in a Next Generation (NG)-RAN

| New Radio (NR) and NG-RAN | Interpretation |
|---|---|
| UL Packet Loss Rate (gNB-CU) | Uplink packet loss rate (from a central unit (CU) of a gNB) |
| UL F1-U Packet Loss Rate (gNB-CU) | Uplink F1-U packet loss rate (from the CU of the gNB) |
| DL Packet Drop Rate (gNB-CU) | Downlink packet drop rate (from the CU of the gNB) |
| DL F1-U Packet Loss Rate (gNB-DU) | Downlink F1-U packet loss rate (from a distributed unit (DU) of the gNB) |
| DL Packet Drop Rate (gNB-DU) | Downlink packet drop rate (from the DU of the gNB) |
| UE Context Release Request (gNB-DU initiated) | Quantity of UE context release requests (initiated by the DU of the gNB) |
| DL/UL Total PRB | Uplink/Downlink total physical |

TABLE 1-continued

Performance parameters and performance indicators
in a Next Generation (NG)-RAN

| New Radio (NR) and NG-RAN | Interpretation |
|---|---|
| Usage (gNB-CU) | resource block usage (from the CU of the gNB) |
| Distribution of DL/UL Total PRB Usage (gNB-DU) | Distribution of uplink/downlink total physical resource block usage (from the DU of the gNB) |
| Mean/Max number of RRC Connections (gNB-CU) | Mean/Maximum quantity of Radio Resource Control (RRC) connections (from the CU of the gNB) |
| IP latency in DL (gNB-DU) | IP latency in downlink (from the DU of the gNB) |
| Average delay DL in CU-UP | Average downlink delay (from the CU of the gNB to a UP) |
| Average delay in gNB-DU | Average delay (from the DU of the gNB) |
| Average delay on F1-U | Average delay on an F1-U Interface |
| Average delay DL air-interface | Downlink air-interface average delay |

TABLE 2

Performance indicators on a 5G core network
(5GC) network function (NF) network element

| 5GC NF | Interpretation |
|---|---|
| Mean/Maximum number of registered subscribers (AMF) | Mean/Maximum quantity of registered subscribers (AMF) |
| Mean/Maximum Number of active PDU sessions (SMF) | Mean/Maximum quantity of active PDU sessions (SMF) |
| Number of incoming General Packet Radio Service (GPRS) Tunneling Protocol (GTP) data packets on the N3 interface, from (R)AN to UPF (UPF, N3) | Quantity of uplink GTP data packets on an N3 interface, from a RAN to a UPF (UPF, N3) |
| Number of outgoing GTP data packets of on the N3 interface, from UPF to (R)AN (UPF, N3) | Quantity of downlink GTP data packets on the N3 interface, from the UPF to the RAN (UPF, N3) |
| Number of octets of incoming GTP data packets on the N3 interface, from (R)AN to UPF (UPF, N3) | Quantity of octets of uplink GTP data packets on the N3 interface, from the RAN to the UPF (UPF, N3) |
| Number of octets of outgoing GTP data packets on the N3 interface, from UPF to (R)AN (UPF, N3) | Quantity of octets of downlink GTP data packets on the N3 interface, from the UPF to the RAN (UPF, N3) |
| N6 outgoing link usage (UPF, N6) | N6 interface uplink usage (UPF, N6) |
| N6 incoming link usage (UPF, N6) | N6 interface downlink usage (UPF, N6) |
| Number of PDU sessions (SMF) | Quantity of PDU sessions (SMF) |

TABLE 3

Performance indicators of an end-to-
end network or network slice instance

| End-to-end (E2E) network/NSI | Interpretation |
|---|---|
| Registered Subscribers of network and network Slice Instance | Registered subscribers of a network and a network slice instance |
| E2E Latency of 5G Network | E2E latency in a 5G network |
| Upstream/Downstream Throughput for Network and Network Slice Instance | Upstream/Downstream throughput for the network and the network slice instance |
| Number of PDU sessions of network and network slice instance | Quantity of PDU ( ) sessions of the network and the network slice instance |
| Virtualized resource utilization of network slice instance | Virtualized resource utilization of the network slice instance |
| DL latency in NG-RAN | DL latency in an NG-RAN |
| Upstream/Downstream Throughput at N3 interface | Upstream/Downstream throughput on an N3 interface |

During actual application, the first network data may further include another parameter that is not defined in an existing standard, or the first network data may be data obtained through normalization. This is not limited in this embodiment of this application. The normalization is mainly to map a physical data value of each data type to fixed value space using the maximum/minimum value normalization method, the Z-Score normalization method, or the like. Such processing not only facilitates improvement of a model training convergence speed in a big data analytics process, but also provides a feature data transmission manner.

It should be noted that the first network data set herein may also be obtained based on the time dimension, the spatial dimension, and the combination of the time dimension and the spatial dimension. A specific obtaining process is similar to the foregoing process of obtaining the first service experience data set. For details, refer to the foregoing related descriptions. Details are not described herein again in this embodiment of this application.

In addition, each piece of first network data and each piece of corresponding first service experience data are correspondingly associated with the foregoing second service experience data set in terms of a time, a location, and the like. For example, if the second service experience data set is a set including a plurality of pieces of second service experience data corresponding to the time from eight o'clock in the morning to six o'clock in the afternoon and corresponding to the location serving cell A, a time corresponding to the first network data and the first service experience data is also from eight o'clock in the morning to six o'clock in the afternoon, and a location corresponding to the first network data and the first service experience data is the serving cell A.

Specific content of each piece of second network data is similar to content of the first network data. Herein, "First" and "second" are used to differentiate between the two types of network data in terms of the time sequence. The first network data is earlier than the second network data in terms of the time sequence. That is, the first network data is historical network data before the second network data. Further, each piece of second network data may include at least one of the following information: the identification information of the network, second time information, second location information, network device information, network interface information, and end-to-end performance information of the network. The second time information is used to identify the time corresponding to the second network data. That is, the second network data is used to indicate a set of performance parameters of the network in a second time. The second location information is used to identify a location corresponding to the second network data. That is, the second network data is used to indicate a set, corresponding to the second location, of performance parameters of the network. For explanations of other meanings of the second network data, refer to the foregoing explanations of the first network data. Details are not described herein again.

Further, the network data analytics device may determine each piece of second network data in the second network data set of the network based on the following process: establishing, by the network data analytics device, an overall service experience model based on the information about the first service quality requirement of the service, the first service experience data set, and the first network data set, that is, establishing a relationship between the first service experience data and the corresponding first network data, thereby determining each piece of second network data based on the relationship. The plurality of pieces of determined second network data form the second network data set. For example, the network data analytics device performs model training based on the information about the first service quality requirement of the service, a large amount of first service experience data, and a large amount of first network data, to obtain the overall service experience model, thereby determining the second network data set based on the overall service experience model.

For example, first, the network data analytics device may obtain a relational model of the first service experience data of the service and the first network data, that is, the overall experience model of the service, based on the linear regression (Linear Regression) method. The model is as follows:

$$g(y)=m_0y_0+m_1y_1+m_2y_2+m_3y_3+\ldots+m_Dy_D. \quad (2)$$

In the formula (2), g(y) is first service experience data of a service, for example, a proportion of a quantity of users whose MOS of a voice service satisfies a requirement. $Y=(y_1, y_2, y_3, \ldots, y_D)$, and the eigenvector is first network data corresponding to the first service experience data, that is, a first parameter of network performance. For example, $y_1$ represents an uplink packet loss rate of an NG RAN, $y_2$ represents an average air interface delay, $y_3$ represents an average quantity of registered subscribers on an AMF, . . . , $y_D$ represents uplink/downlink usage on the N6 interface, and y0 is a constant 1. $M=(m_1, m_2, m_3, \ldots, m_D)$, is a parameter vector, and is also referred to as a weight vector identifier. $m_i$ represents a value of a weight of impact from an $i^{th}$ parameter in the first network data on the first service experience data set of the service.

The linear regression refers to an example of the data analytics algorithm. The network data analytics device may obtain the overall experience model of the service based on another algorithm. This is not limited in the present disclosure.

Then, the network data analytics device determines, based on the overall experience model, a value of an eigenvector corresponding to a first service quality requirement, that is, obtains the second network data set. For example, the model g(y) is known, and a value combination $Y=(y_1, y_2, y_3, \ldots, y_D)$ corresponding to 80% is obtained based on a value 80% of g(y). For another example, the model g(y) is known, and a value combination $Y=(y_1, y_2, y_3, \ldots, y_D)$ corresponding to a time and a location is obtained based on a value 80% of g(y).

The determining, based on the overall experience model, the value of the eigenvector corresponding to the first service quality requirement belongs to a multi-criteria decision-making (MCDM) problem. The network data analytics device may obtain the value of the eigenvector based on an existing MCDM method, that is, obtain the second network data set. In general, a combination of a plurality of sets of eigenvectors that satisfy the first service quality requirement may be obtained. That is, a combination of a plurality of sets of second network data may be obtained.

S204: The network data analytics device sends the second network data set to the network management device or the network repository device.

In an optional implementation, after the network data analytics device determines the second network data set, the network data analytics device may send the second network data set to the network management device. In this implementation, the network management device may adjust or set the network based on the second network data set. Further, the network management device may adjust the network based on a piece of second network data in the second network data set to enable the service in the network to satisfy the first service quality requirement of the service. For example, the network management device sets network-level data to the second network data.

In an optional implementation, in step S204, the network data analytics device may alternatively send the second network data set to the network repository device (for example, an NRF network element). In this implementation, the network repository device may obtain network adjustment policy information based on the second network data set, and send the network adjustment policy information to the network management device such that the network management device adjusts the network based on the network adjustment policy information. The network adjustment policy information may include a piece of second network data in the second network data set.

In the foregoing two implementations, the network may be a slice network, a slice instance network, or a slice subnet instance network.

S205: Optionally, the network management device adjusts the network based on the second network data set to enable the service to satisfy the first service quality requirement of the service.

When the network management device receives the second network data set sent by the network data analytics device, the network management device may adjust the network based on a piece of second network data in the second network data set, that is, adjust a status of the network to a state corresponding to the second network data such that the overall experience of the service satisfies the first service quality requirement of the service.

For example, to satisfy the first service quality requirement of the service, it is assumed that the network data analytics device obtains settings of three sets of second network data in step 203. The settings are shown in the following Table 4:

TABLE 4

| Sequence number/Parameter | Uplink packet loss rate of an NG RAN | Air interface Delay | Average quantity of registered subscribers on an AMF | N6 interface uplink usage | N6 interface downlink usage |
|---|---|---|---|---|---|
| 1 | <5% | <5 milliseconds (ms) | <100k | <20% | <90% |
| 2 | <6% | <4 ms | <80k | <30% | <80% |
| 3 | <7% | <3 ms | <50k | <50% | <60% |

In this case, the network management device may determine, based on the foregoing settings of the three sets of second network data, how to adjust the network. Specific methods include but are not limited to the following methods.

In a possible design, the network management device may randomly select one set of second network data from the three sets of second network data, and set the network performance parameter based on the selected second network data. For example, network management device may randomly select second network data corresponding to the sequence number 1, to set the network.

In another possible design, the network management device may alternatively select a set of second network data that makes a minimum comprehensive change to a current network parameter, and set the network performance parameter based on the selected second network data. For example, if a current network performance parameter combination is that an uplink packet loss rate of the NG RAN is 10%, an air interface delay is 2 ms, an average quantity of registered subscribers on the AMF is 60 k, and both an N6 interface uplink usage and an N6 interface downlink usage are 40%, the network management device is likely to select second network data corresponding to the sequence number 3, to set the network.

In another possible design, the network management device may further select a set of second network data based on a bottleneck parameter of a current network, and set the network performance parameter based on the selected second network data. For example, assuming that an air interface delay parameter is the bottleneck parameter of the network, the network management device may set the network based on second network data corresponding to the sequence number 1 and having a minimum requirement on an air interface delay.

It should be noted that a specific method for adjusting or setting a network by the network management device based on the selected second network data is not limited in the present disclosure. For example, how the network management device adjusts an air interface delay of a slice network from current 8 ms to an air interface delay that is included in the selected second network data and that is less than 3 ms is not limited in the present disclosure. For example, the network management device may achieve an objective of reducing the air interface delay by increasing a bandwidth resource of an air interface, or may achieve an objective of reducing the air interface delay by increasing a quantity of access network devices to reduce a user capacity of a single device.

In addition, that the network management device adjusts or sets the network based on to the second network data does not definitely mean that a corresponding network resource needs to be added because a network resource is insufficient, or may mean that a network resource is redundancy, and the network management device may reduce a corresponding network resource.

Optionally, when a data analytics function network element sends the second network data set to the network repository device in S204, the network repository device may also trigger network adjustment based on the second network data set to enable the service to satisfy the first service quality requirement of the service. A method for triggering, by the network repository device, the network adjustment includes but is not limited to the following method.

In a possible implementation, the network repository device may obtain the network adjustment policy information based on the second network data set, and send the network adjustment policy information to the network management device such that the network management device adjusts the network based on the network adjustment policy information. Further, the network adjustment policy information may be a piece of second network data. For example, in the other approaches, the network repository device can obtain resource information and status information of each network element in the network. Therefore, the network repository device may select a set of second network data from the second network data set based on the resource information and the status information that are owned by the network repository device, and send the selected second network data to the network management device such that the network management device adjusts or sets the network based on the second network data selected by the network repository device.

In this embodiment of this application, the data analytics function network element may be the network data analytics device. The network data analytics device obtains the first service experience data set of the service, determines the second network data set of the network based on the first service experience data set of the service, the first network data set of the network, and the information about the first service quality requirement, and sends the second network data set of the network to the network management device such that the network management device adjusts the network based on the second network data set, and the service satisfies the first service quality requirement of the service, thereby improving network performance.

Figure 3:
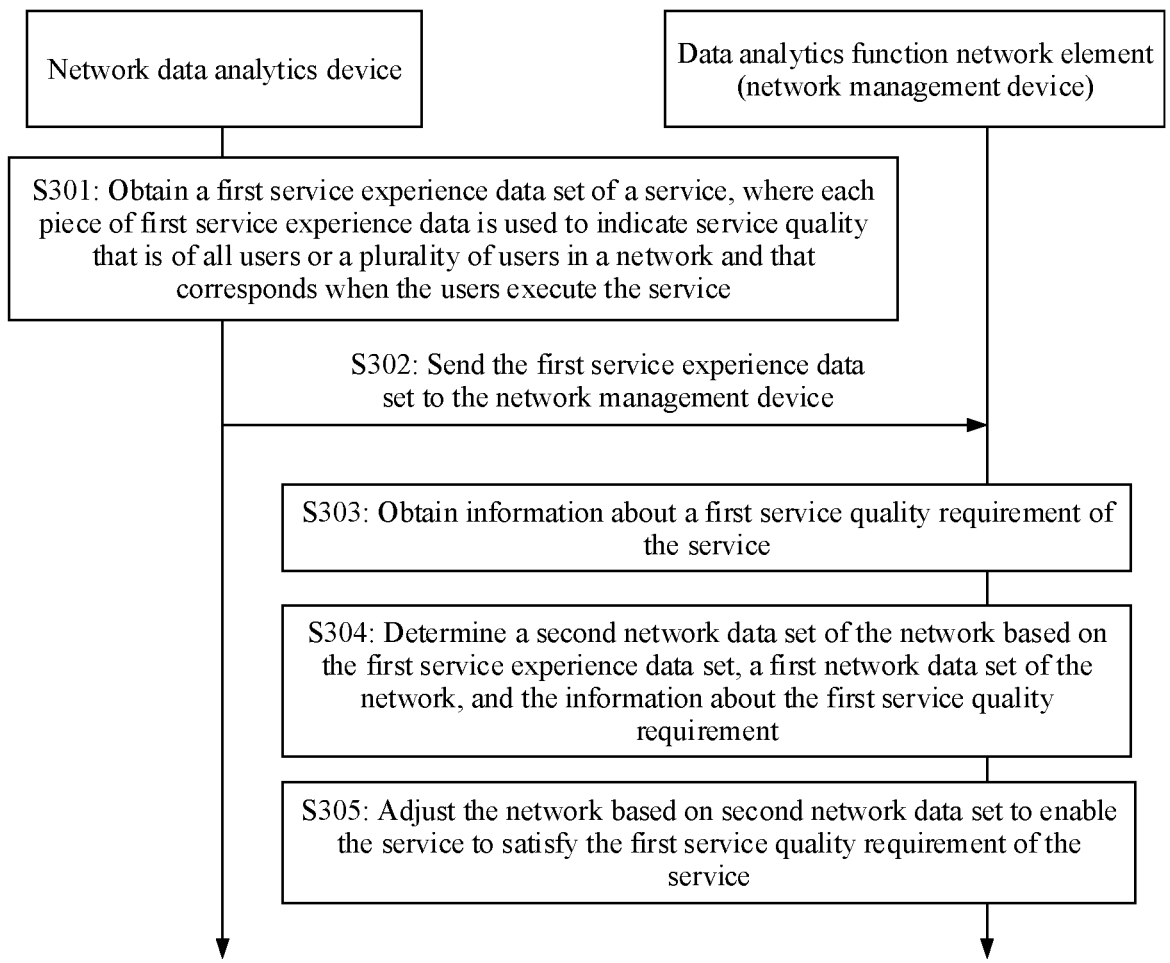
FIG. 3 is a schematic flowchart of a resource management method according to an embodiment of this application.

FIG. 3 is a schematic flowchart of a resource management method according to an embodiment of this application. Referring to FIG. 3, the method includes the following several steps.

S301: A network data analytics device obtains a first service experience data set of a service, where each piece of first service experience data in the first service experience data set is used to indicate service quality of all users or a plurality of users in a network, wherein the service is executed by the users, and the service is run in the network.

It should be noted that a specific process in which the network data analytics device obtains the first service experience data set of the service in step S301 is consistent with the description in step S201, and the first service experience data set of the service in step S301 is consistent with the description of the first service experience data set of the service in step S201. For details, refer to the description in step S201. Details are not described herein again in this embodiment of this application.

S302: The network data analytics device sends the first service experience data set of the service to a network management device.

For example, the network management device may be the OAM network element or the NSMF network element in FIG. 1. After the network data analytics device obtains the first service experience data set of the service, the network data analytics device may send the first service experience data set of the service to the network management device such that the network management device obtains the first service experience data set of the service.

S303: The network management device obtains information about a first service quality requirement of the service. S303 may be performed before or after S301 and S302, or S303 and S301 may be performed simultaneously, or S303 and S302 may be performed simultaneously. In FIG. 3, an example in which S303 is performed after S302 is used for description.

A specific meaning of the information about the first service quality requirement is similar to the meaning, described in S202, of the information about the first service quality requirement. Details are not described herein again.

The network management device may obtain the information about the first service quality requirement of the service from a service server of the service or a network tenant. Alternatively, the network management device obtains the information about the first service quality requirement of the service from the network data analytics device. The information, in the network data analytics device, about the first service quality requirement of the service may be obtained from a service server of the service or a network tenant, or may be obtained by the network data analytics device in another manner. This is not limited in this embodiment of this application.

Optionally, the network management device may separately obtain information about a second service quality requirement or the information about the first service quality requirement from the service server. Alternatively, the network management device may obtain both information about a second service quality requirement and the information about the first service quality requirement from the service server. For example, the information about the second service quality requirement and the information about the first service quality requirement may be included in a same message or a same information element and obtained by the network management device. A specific meaning of the information about the second service quality requirement is similar to the meaning, described in S201, of the information about the second service quality requirement. Details are not described herein again.

S304: The network management device determines a second network data set of the network based on the first service experience data set of the service, a first network data set of the network, and the information about the first service quality requirement.

It should be noted that, in this embodiment, the network management device actually serves as the data analytics function network element in the present disclosure. The technical terms and a related implementation process in step S304 are similar to those in step S203 in the embodiment in FIG. 2. A difference lies only in that an execution body is changed from the network data analytics device to the network management device. To be specific, for a specific operation performed by the network management device in step 304, refer to the related description of the network data analytics device in step S203. Details are not described herein again in this embodiment of this application.

S305: The network management device adjusts the network based on the second network data set to enable the service to satisfy the first service quality requirement of the service.

It should be noted that the technical terms and a related implementation process in step S305 are similar to those in step S205 in the embodiment in FIG. 2. For details, refer to the related description in step S205. Details are not described herein again in this embodiment of this application.

In this embodiment of this application, the network data analytics device obtains the first service experience data set of the service, and sends the first service experience data set of the service to the network management device. As the data analytics function network element, the network management device determines the second network data set of the network based on the first service experience data set of the service, the first network data set of the network, and the information about the first service quality requirement. The network management device adjusts the network based on the second network data set obtained by the network management device through analytics such that the service satisfies the first service quality requirement of the service, thereby improving network performance. In addition to the method for determining the second network data set of the network in step S203, in another possible design of step 304 in this embodiment, the method for determining the second network data set of the network further includes:

(1) If the network management device determines, based on the first service experience data set of the service, that the network cannot satisfy the first service quality requirement, the network management device triggers network adjustment.

Further, the network management device sends network resource adjustment notification information to an access network device or a core network device, and the corresponding access network device or core network device adjusts a corresponding network resource based on the resource adjustment notification information. The access network device includes an access network management device, and the core network device includes a core network management device.

(2) The network management device cyclically performs step S301 and step (1), and determines the second network data set of the network based on continuously received first service experience data.

A set of the first service experience data received by the network management device again in (2) is actually a set of service experience data corresponding to a time point/period that is after the network adjustment in (1).

In a procedure of the design method, the network management device uses the first service experience data set received in (1) as a trigger condition of the network adjustment, to perform a network adjustment operation, and determines, based on the first service experience data continuously collected after the network adjustment, whether the network adjustment is in place. When the collected first service experience data indicates that the first service quality requirement can be satisfied, network data corresponding to the first service experience data is second network data.

Figure 4:
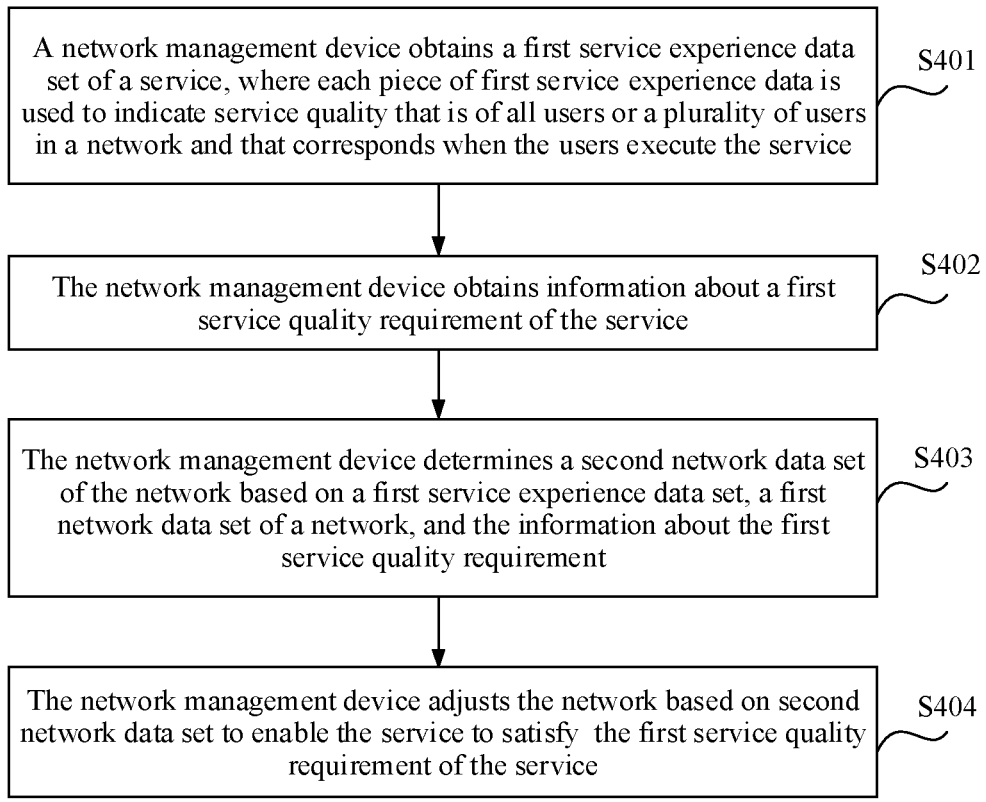
FIG. 4 is a schematic flowchart of a resource management method according to an embodiment of this application.

FIG. 4 is a schematic flowchart of a resource management method according to an embodiment of this application. The method may be applied to the network shown in FIG. 1. Referring to FIG. 4, the method includes the following several steps.

S401: A network management device obtains a first service experience data set of a service, where each piece of first service experience data in the first service experience data set is used to indicate service quality of all users or a plurality of users in a network, wherein the service is executed by the users, and the service is run in the network.

The network management device may be the OAM network element or the NSMF network element in FIG. 1.

Optionally, the network management device may obtain the first service experience data set of the service from a network data analytics device or a service server of the service.

It should be noted that a specific process in which the network data analytics device obtains the first service experience data set of the service in step S401 is consistent with the description in step S201, a specific process in which the service server obtains the first service experience data set of the service in step S401 is consistent with the description in step S201, and the first service experience data set of the service in step S401 is consistent with the description of the first service experience data set of the service in step S201. For details, refer to the description in step S201. Details are not described herein again in this embodiment of this application.

For a specific implementation method of S402 to S404, refer to steps S303 to S305. Further, for S402, refer to step S303, for S403, refer to step S304, and for S404, refer to step S305.

In this embodiment of this application, the data analytics function network element may be the network management device. The network management device directly obtains the first service experience data set of the service, determines the second network data set of the network based on the first service experience data set of the service, the first network data set of the network, and the information about the first service quality requirement, and adjusts the network based on the second network data set such that the service satisfies the first service quality requirement of the service, thereby improving network performance.

In the different resource management methods provided in FIG. 2, FIG. 3, and FIG. 4 in this application, in the resource management method provided in FIG. 2, the network data analytics device serves as the data analytics function network element, and performs a large amount of data statistics and analytics work, to obtain a network performance parameter setting that satisfies the first service quality requirement of the service. The network management device may not need to perform statistics and training of a large amount of data, and directly determines, based on the recommended network performance parameter setting, how to adjust the network such that power consumption of the network management device can be reduced. In addition, efficiency is higher because data analytics and network adjustment are separately performed by two network elements. In the resource management methods provided in FIG. 3 and FIG. 4, the network management device serves as the data analytics function network element, and performs a large amount of data statistics and analytics work, to obtain a network performance parameter setting that satisfies the first service quality requirement of the service. A difference lies only in that in the method shown in FIG. 3, the network management device needs to obtain a large amount of first service experience data of the service from the network data analytics device, and in the method shown in FIG. 4, the network management device may directly obtain a large amount of first service experience data of the service from the service server. An advantage of the method shown in FIG. 3 lies in that the first service experience data set, obtained by the network management device, of the service is from the inside of the network instead of an external service server, and is more credible to some extent. An advantage of the method shown in FIG. 4 is higher efficiency.

Figure 5:
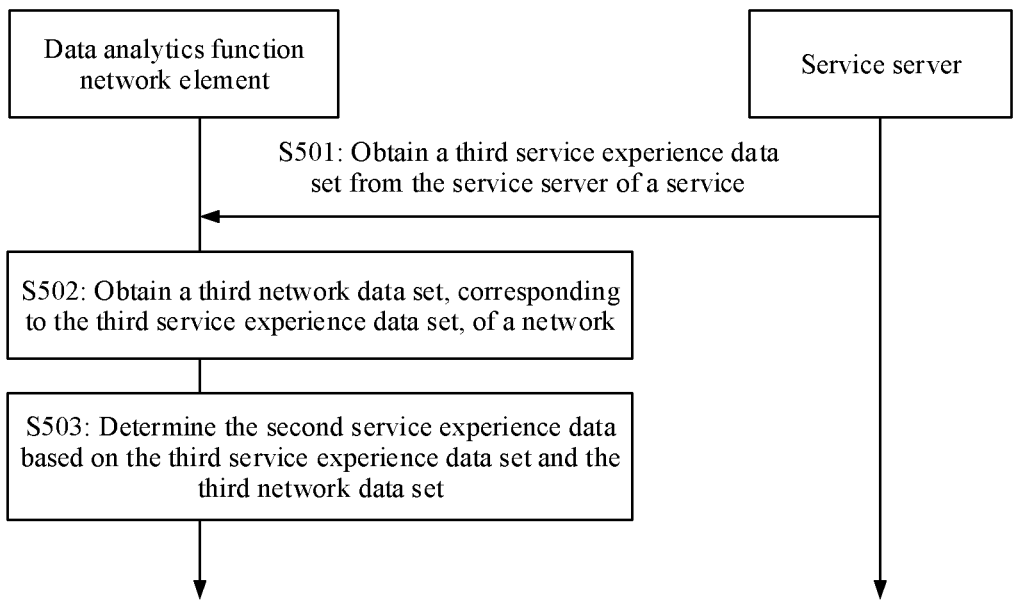
FIG. 5 is a schematic flowchart of a service monitoring method according to an embodiment of this application.

FIG. 5 is a schematic flowchart of a service monitoring method according to an embodiment of this application. Referring to FIG. 5, the method includes the following several steps.

S501: A data analytics function network element obtains a third service experience data set from a service server of a service, where each piece of third service experience data in the third service experience data set is used to indicate service quality, corresponding to a single user, of the service.

The data analytics function network element may be a network data analytics device. For example, the network data analytics device may be an NWDAF.

In addition, each piece of third service experience data includes at least one of the following information: identification information of a user, association identification information of the user, service quality assessment data of the user, and service description information. The identification information of the user is used to uniquely identify the user. For example, the identification information of the user may be a user account, an IMSI, or the like. The association identification information of the user is used to associate user-level experience data of the user with flow-level network data for running a service of the user. For example, the association identification information of the user may be an IP address of a user terminal used by the user or a temporary identifier allocated by the network to a service flow of the user terminal. The temporary identifier may be allocated by a PCF network element, an NWDAF network element, an NRF network element, or another server network element to the service flow in a process of establishing the service flow, and is used to identify corresponding flow-level network data on each network element corresponding to the service flow. The temporary identifier is distributed, in the process of establishing the service flow, by the PCF network element to each network element corresponding to the service flow. The service quality assessment data of the user is data used to assess service quality of the user. For example, if the service is a voice service, the assessment data may be a MOS, voice fluency, or the like of a voice service of the user. The service description information is information used to describe a user data flow corresponding to the service, for example, a total data volume and a latency of the user data flow.

The third service experience data obtained by the data analytics function network element from the service server of the service may be data obtained through normalization such that security of user information can be ensured. The normalization herein refers to an operation of mapping a physical value of a parameter to fixed value space, for example, an operation of mapping a physical value of each feature to the fixed value space using a maximum/minimum value normalization method, a Z-Score normalization method, or the like.

Further, in a running process of the service, the service server of the service may obtain the user-level service experience data, that is, the third service experience data, using a method of measuring and calculating by the service server and the like. A plurality of pieces of third service experience data form the third service experience data set. The service server sends the third service experience data set to the network data analytics device. For example, the service server of the service may actively send the third service experience data set to the data analytics function network element. Alternatively, the data analytics function network element sends request information to the service server, where the request information is used to request to obtain the third service experience data set. Therefore, when receiving the request information, the service server may send the third service experience data set to the data analytics function network element.

It should be noted that the third service experience data herein and second service experience data below are used to differentiate between service experience data in terms of a time sequence. A time sequence corresponding to the third service experience data herein is earlier than a time sequence corresponding to the second service experience data below. A specific meaning of the third service experience data herein is similar to the meaning, described in step S201, of the third service experience data. Details are not described herein again.

S502: The data analytics function network element obtains a third network data set, corresponding to the third service experience data set, of the network.

Each piece of third network data in the third network data set may include at least one of the following information: identification information of the network, fourth time information, fourth location information, network device information, network interface information, and end-to-end performance information of the network. A difference between the third network data herein and second network data below lies only in a time sequence. A specific meaning of the third network data is similar to the meaning, described in step S203, of the third network data. Details are not described herein again.

Further, when the data analytics function network element is the network data analytics device, the network data analytics device may directly obtain the third network data set in a service flow level from a corresponding network element. Alternatively, the network data analytics device may obtain the third network data set from a network management device or a network repository device.

It should be noted that for a specific process in which the data analytics function network element obtains the third network data set, refer to the related description in step S203. Details are not described herein again in this embodiment of this application.

S503: The data analytics function network element determines the second service experience data based on the third service experience data set and the third network data set.

Further, determining, by the data analytics function network element, a second service experience data set may include obtaining flow-level fourth network data, and determining the second service experience data based on the third service experience data set, the third network data set, and the fourth network data.

The data analytics function network element may further obtain information about a second service quality requirement of the service. The information about the second service quality requirement refers to a requirement on user-level service quality of the service (for example, a MOS of a voice service of the single user is required to be greater than 3).

Further, the data analytics function network element determines a user-level service experience model of the service based on the third service experience data set, the third network data set, and the information about the second service quality requirement, where the service experience model is used to represent a relationship indicating variation of the user-level service experience data of the service along with the flow-level network data corresponding to the service, and determines the second service experience data based on the service experience model.

It should be noted that a specific meaning of the information about the second service quality requirement herein is similar to the specific meaning of the information about the second service quality requirement in step S201, a specific meaning of the fourth network data is similar to the specific meaning of the fourth network data in step S201, and a specific process in which the data analytics function network element determines the second service experience data is similar to the specific process in which the network data analytics device obtains the second service experience data in the manner 2 in step S201. For details, refer to the related description in S201. Details are not described herein again in this embodiment of this application.

In the service monitoring method provided in this embodiment of this application, the data analytics function network element obtains a first service experience data set from the service server of the service, obtains a flow-level first network data set, corresponding to the first service experience data set, of the service, and determines the user-level service experience model of the service based on the first service experience data set and the first network data set, thereby determining the second service experience data based on the service experience model. The second service experience data is determined based on the service experience model, and is not directly obtained from the service server of the service. In this way, a case in which a tenant sends false user-level experience data to reduce costs and hope to obtain better service quality can be avoided, and fairness between a carrier and the tenant is ensured.

A person skilled in the art may understand that the foregoing several method embodiments are described in a progressive manner. To avoid repetition, for related explanations and descriptions of a same object in different embodiments, refer to related descriptions in the foregoing embodiments. For example, for explanations and descriptions of related technical terms in FIG. 3 to FIG. 5, refer to the description of the related technical terms in the embodiment in FIG. 2.

The foregoing mainly describes the solutions provided in the embodiments of this application from a perspective of interaction between the network elements. It may be understood that, to implement the foregoing functions, the network elements such as the data analysis function network element (for example, the network data analysis device and the network management device) include corresponding hardware structures and/or software modules for performing the functions. A person skilled in the art should be easily aware that, in combination with the examples described in the embodiments disclosed in this specification, network elements and algorithms steps may be implemented using hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the data analysis function network element (for example, the network data analysis device and the network management device) based on the foregoing method example. For example, each function module may be obtained through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely a logical function division. During actual implementation, another division manner may be used.

Figure 6:
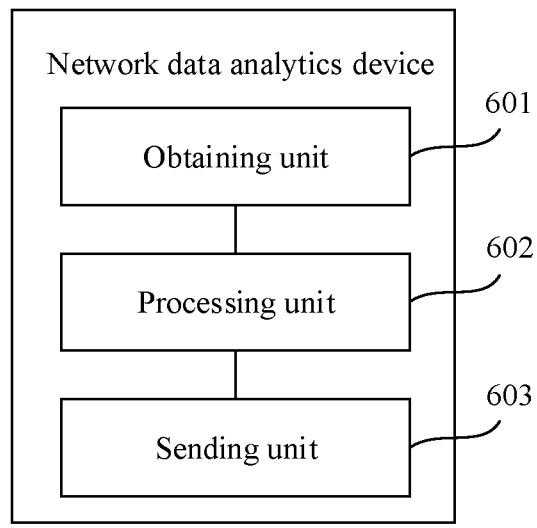
FIG. 6 is a schematic structural diagram of a network data analytics device according to an embodiment of this application.

When each function module is obtained through division corresponding to each function, FIG. 6 is a possible schematic structural diagram of the network data analytics device in the foregoing embodiments. The network data analytics device includes an obtaining unit 601, a processing unit 602, and a sending unit 603.

In the method embodiment shown in FIG. 2, the obtaining unit 601 or the obtaining unit 601 and the processing unit 602 are configured to support the network data analytics device in performing S201 and S202 in FIG. 2, the processing unit 602 is configured to support the network data analytics device in performing S203 in FIG. 2, and the sending unit 603 is configured to support the network data analytics device in performing S204 in FIG. 2. All related content of the steps in the method embodiment shown in FIG. 2 may be cited in function descriptions of corresponding function modules. Details are not described herein again.

In the method embodiment shown in FIG. 3, the obtaining unit 601 or the obtaining unit 601 and the processing unit 602 are configured to support the network data analytics device in performing S301 in FIG. 3, and the sending unit 603 is configured to support the network data analytics device in performing S302 in FIG. 3. All related content of the steps in the method embodiment shown in FIG. 3 may be cited in function descriptions of corresponding function modules. Details are not described herein again.

In the method embodiment shown in FIG. 5, the obtaining unit 601 is configured to support the network data analytics device in performing S501 and S502 in FIG. 5, and the processing unit 602 is configured to support the network data analytics device in performing S503 in FIG. 5. Optionally, the sending unit 603 may be configured to support the network data analytics device in sending, to a service server, request information used to request a third service experience data set. All related content of the steps in the method embodiment shown in FIG. 5 may be cited in function descriptions of corresponding function modules. Details are not described herein again.

In terms of hardware implementation, the processing unit 602 may be a processor, the obtaining unit 601 may be a receiver, the sending unit 603 may be a transmitter. A transceiver or a communications interface may include the receiver and the transmitter.

Figure 7:
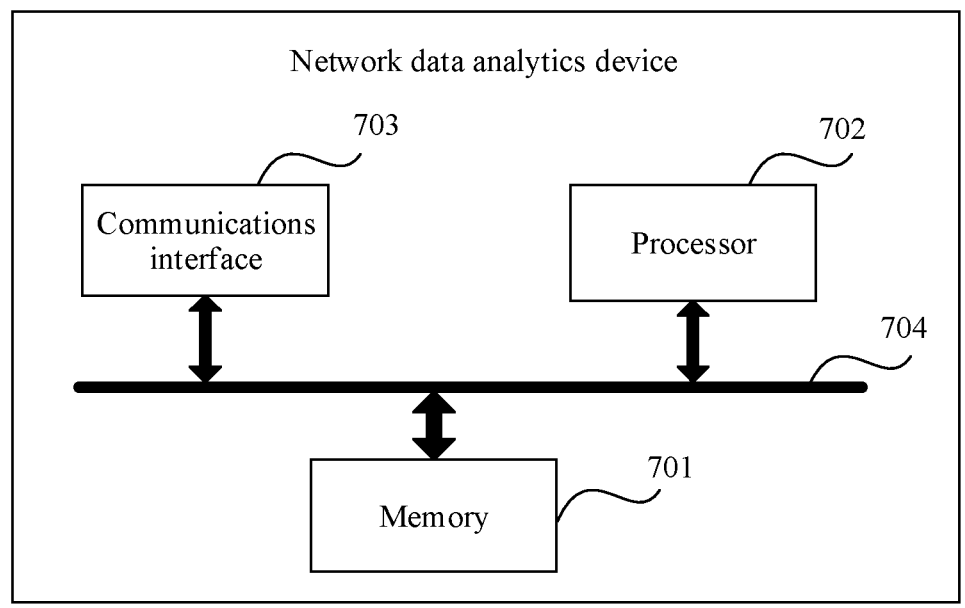
FIG. 7 is a schematic structural diagram of a network data analytics device according to an embodiment of this application.

FIG. 7 is a possible schematic logical structural diagram of the network data analytics device in the foregoing embodiments according to an embodiment of this application. The network data analytics device includes a processor 702, a communications interface 703, a memory 701, and a bus 704. The processor 702, the communications interface 703, and the memory 701 are connected to each other using the bus 704. In this embodiment of this application, the processor 702 is configured to control and manage an action of the network data analytics device. For example, the processor 702 may be configured to support the network data analytics device in performing one or more of S201 to S203 in FIG. 2, S301 in FIG. 3, or S503 in FIG. 5, and/or performing another process used for the technology described in this specification. The communications interface 703 is configured to support communication of the network data analytics device. The memory 701 is configured to store program code and data of the network data analytics device.

The processor 702 may be a CPU, a general purpose processor, a digital signal processor (DSP), an application-specific integrated circuit (ASIC), a field-programmable gate array (FPGA) or another programmable logic device, a transistor logic device, a hardware component, or any combination thereof. The processor 702 may implement or execute various examples of logical blocks, modules, and circuits that are described with reference to content disclosed in this application. Alternatively, the processor may be a combination of processors implementing a computing function, for example, a combination of one or more microprocessors or a combination of a digital signal processor and a microprocessor. The bus 704 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

Figure 8:
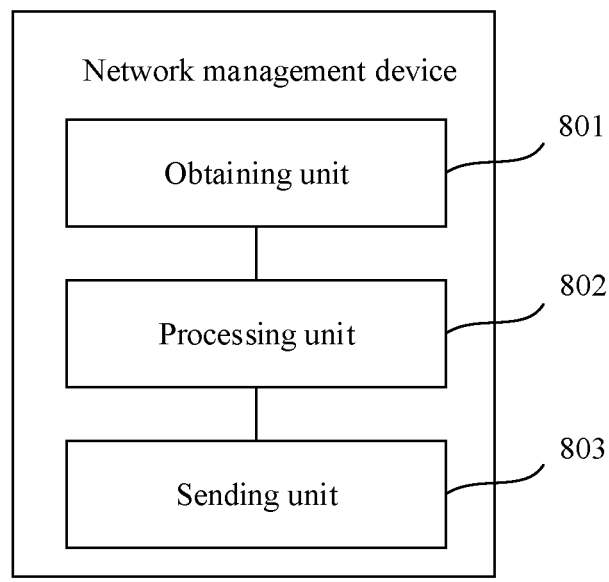
FIG. 8 is a schematic structural diagram of a network management device according to an embodiment of this application.

When each function module is obtained through division corresponding to each function, FIG. 8 is a possible schematic structural diagram of the network management device in the foregoing embodiments. The network management device includes an obtaining unit 801, a processing unit 802, and a sending unit 803.

In the method embodiment shown in FIG. 2, the obtaining unit 801 is configured to support a step of receiving, by the network management device, the second network data set sent in S204 in FIG. 2, and the processing unit 802 is configured to support the network management device in performing S205 in FIG. 2. Optionally, the sending unit 803 is configured to support a step of sending, by the network management device, a first network data set to a network data analytics device. All related content of the steps in the method embodiment shown in FIG. 2 may be cited in function descriptions of corresponding function modules. Details are not described herein again.

In the method embodiment shown in FIG. 3, the obtaining unit 801 is configured to support a step of receiving, by the network management device, the first service experience data set, sent in S302 in FIG. 3, of the service and S303, and the processing unit 802 is configured to support the network management device in performing S304 in FIG. 3. Optionally, the sending unit 803 is configured to support a step of sending, by the network management device, a first network data set to a network data analytics device. All related content of the steps in the method embodiment shown in FIG. 3 may be cited in function descriptions of corresponding function modules. Details are not described herein again.

In the method embodiment shown in FIG. 4, the obtaining unit 801 or the obtaining unit and the processing unit 802 are configured to support the network management device in performing S401 in FIG. 4, the obtaining unit 801 is further configured to support the network management device in performing S402 in FIG. 4, and the processing unit 802 is configured to support the network management device in performing S403 in FIG. 4. All related content of the steps in the method embodiment shown in FIG. 4 may be cited in function descriptions of corresponding function modules. Details are not described herein again.

In the method embodiment shown in FIG. 5, the obtaining unit 801 is configured to support the network management device in performing S501 and S502 in FIG. 5, and the processing unit 802 is configured to support the network management device in performing S503 in FIG. 5. Optionally, the sending unit 803 may be configured to support the network management device in sending, to a service server, request information used to request a third service experience data set. All related content of the steps in the method embodiment shown in FIG. 5 may be cited in function descriptions of corresponding function modules. Details are not described herein again.

In terms of hardware implementation, the processing unit 802 may be a processor, the obtaining unit 801 may be a receiver, the sending unit 803 may be a transmitter. A transceiver or a communications interface may include the receiver and the receiver.

Figure 9:
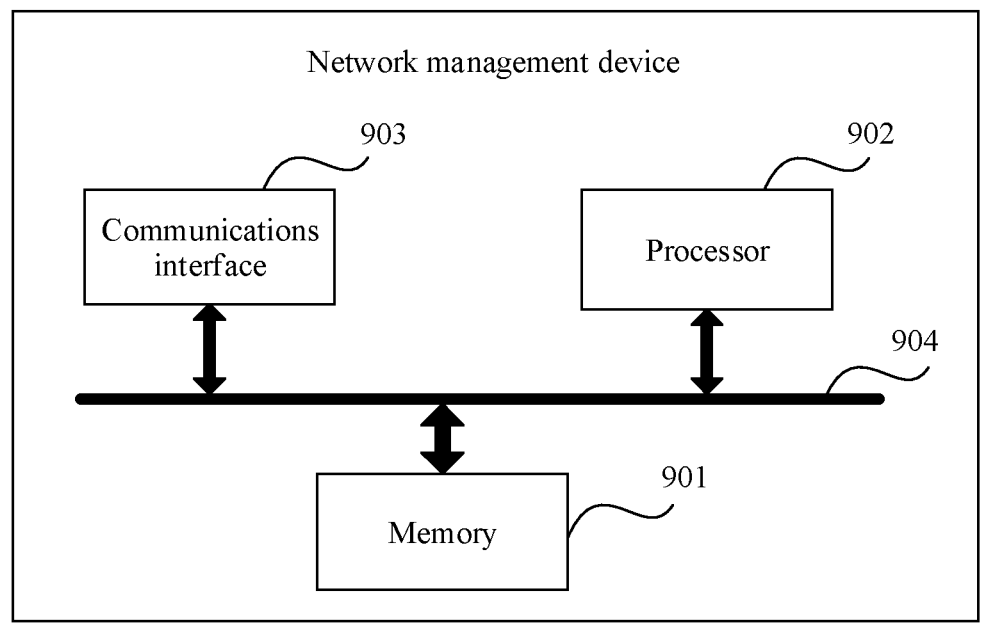
FIG. 9 is a schematic structural diagram of a network management device according to an embodiment of this application.

FIG. 9 is a possible schematic logical structural diagram of the network management device in the foregoing embodiments according to an embodiment of this application. The network management device includes a processor 902, a communications interface 903, a memory 901, and a bus 904. The processor 902, the communications interface 903, and the memory 901 are connected to each other using the bus 904. In this embodiment of this application, the processor 902 is configured to control and manage an action of the network management device. For example, the processor 902 may be configured to support the network management device in performing S205 in FIG. 2, S304 in FIG. 3, or either or both of S401 and S403 in FIG. 4, and/or performing another process used for the technology described in this specification. The communications interface 903 is configured to support communication of the network management device. The memory 901 is configured to store program code and data of the network management device.

The processor 902 may be a CPU, a general purpose processor, a DSP, an ASIC, an FPGA or another programmable logic device, a transistor logic device, a hardware component, or any combination thereof. The processor 902 may implement or execute various examples of logical blocks, modules, and circuits that are described with reference to content disclosed in this application. Alternatively, the processor may be a combination of processors implementing a computing function, for example, a combination of one or more microprocessors or a combination of a digital signal processor and a microprocessor. The bus 904 may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

An embodiment of this application further provides a chip system used in a data analytics function network element. The chip system includes a processor, a memory, a communications interface, and a bus. The processor, the memory, and the communications interface are connected using the bus. When the chip system is embedded in a network data analytics device, the chip system is configured to support the network data analytics device in performing one or more steps performed by the network data analytics device in the foregoing method embodiments. When the chip system is embedded in a network management device, the chip system is configured to support the network management device in performing one or more steps performed by the network management device in the foregoing method embodiments.

An embodiment of this application further provides a communications system. The communications system includes a data analytics function network element and a service server. The data analytics function network element may be a network data analytics device or a network management device. The network data analytics device may be the network data analytics device provided in FIG. 6 or FIG. 7, and is configured to perform the steps performed by the network data analytics device in the foregoing method embodiments, and/or the network management device is the network management device provided in FIG. 8 or FIG. 9, and is configured to perform the steps performed by the network management device in the foregoing method embodiments.

All or some of the foregoing methods in the embodiments of this application may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, a network device, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Based on such understanding, an embodiment of this application further provides a computer-readable storage medium. The computer-readable storage medium stores an instruction. When the instruction is run on a computer, the computer is enabled to perform one or more steps performed by the data analytics function network element in the foregoing method embodiments.

An embodiment of this application further provides a computer-readable storage medium. The computer-readable storage medium stores an instruction. When the instruction is run on a computer, the computer is enabled to perform one or more steps performed by the network management device in the foregoing method embodiments.

An embodiment of this application further provides a computer program product including an instruction. When the computer program product runs on a computer, the computer is enabled to perform one or more steps performed by the data analytics function network element in the foregoing method embodiments.

An embodiment of this application further provides a computer program product including an instruction. When the computer program product runs on a computer, the computer is enabled to perform one or more steps performed by the network management device in the foregoing method embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In conclusion, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

An interaction operation between two device network elements in all the embodiments of this application, for example, an information/data sending operation, may be a direct interaction operation or an indirect interaction operation. That is, the two device network elements may or may not send information/data using an intermediate device network element. This is not limited in this application.

A network management device in all the embodiments of this application refers to a network element that has network deployment, analytics, maintenance, and adjustment functions. For example, the network management device may be an OAM network element, an NSMF network element, an MDASF (management data analytic service function, management data analytic service function) network element, or the like.

In addition, this application further provides the following embodiments. A network element in the following embodiments may be a corresponding network element in the foregoing embodiments. For example, a network data analytics device may be the foregoing network data analytics device, and an NS SF network element may be the foregoing NS SF network element.

It should be noted that, a name of information in the following embodiments is not limited in this application. That is, information having a same name in the following embodiments and the foregoing embodiments may be same information, or may be different information. This is not limited herein. The following embodiments and the foregoing embodiments may be combined with each other, or may be independently applied. A same or similar concept or process may not be described in detail again in the following some embodiments.

It should be noted that, for all the embodiments of this application, experience data may also be referred to as quality of service data. For example, network experience data may also be referred to as network quality of service data, and service experience data may be referred to as service quality of service data.

Figure 10:
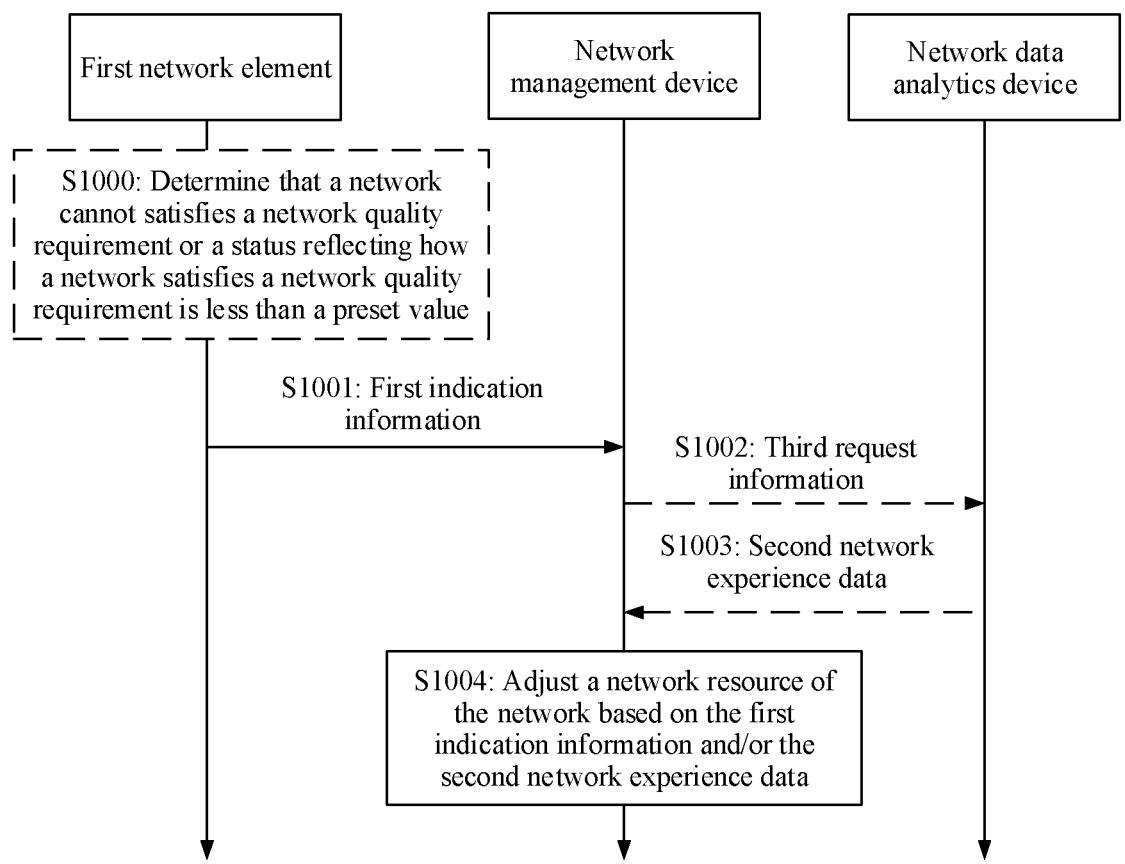
FIG. 10 is a schematic flowchart of a resource management method according to an embodiment of this application.

FIG. 10 is a schematic flowchart of a resource management method according to an embodiment of this application. Referring to FIG. 10, the method includes the following several steps.

S1000: Optionally, a first network element determines that a network cannot satisfy a network quality requirement or a status reflecting how a network satisfies a network quality requirement is less than a preset value.

The first network element may be a network management and control network element in a control plane or a network management and control network element in a management plane. This is not limited in the present disclosure. For example, the first network element may be an NSSF network element, a PCF network element, an NSMF network element, or another network element having functions of network management and control and access user quantity control.

In some possible designs, network quality is information reflecting experience of a network granularity. In this case, the network quality requirement includes an overall network quality requirement, for example, a requirement (for example, being greater than 1 million) on a quantity of registered subscribers in the network, a requirement (for example, being greater than 800000) on a quantity of online users, a network latency requirement (for example, being less than 2 ms), and a network load information requirement.

In some other possible designs, network quality is information reflecting experience of a service granularity in the network. In this case, the network quality requirement includes a service quality requirement corresponding to at least one service in the network, for example, a requirement (for example, being greater than 500000) on a quantity of users of a service A in the network, a requirement on a MOS of the service A (for example, the MOS>3), and a requirement (for example, >95%) on a proportion of a quantity of users whose MOS s of the service A are greater than 3 to a total quantity of users of the service A.

The network quality requirement in the first network element may be directly obtained from a network tenant (for example, a network slice tenant) or a service server. Alternatively, the network quality requirement in the first network element may be obtained from a network management device (for example, OAM) of the network. Alternatively, the network quality requirement in the first network element may be obtained from a network data analytics device (for example, an NWDAF). Alternatively, the network quality requirement in the first network element may be obtained from a policy control device (for example, a PCF) of the network. Alternatively, the network quality requirement in the first network element is fixedly configured in the first network element in a network configuration process.

A specific method for determining, by the first network element, whether the network satisfies the network quality requirement may include but is not limited to the following manner:

(1) The first network element receives first network experience data from the network data analytics device.

The first network experience data is data that can reflect network quality of service, and therefore, may also be referred to as first network quality of service data.

In some possible designs, the first network experience data includes experience data of the network granularity. That is, the experience data is data that describes an overall network experience status, for example, the total quantity of registered subscribers in the network or the total quantity of online users in the network, a network latency, and network load information.

In some other possible designs, the first network experience data includes experience data of the service granularity. That is, the experience data is data that describes a service experience status in the network, for example, the total quantity of users of the service A in the network, the MOS of the service A, and the proportion of the quantity of users whose MOSs of the service A are greater than 3 to the total quantity of users of the service A. Specific content and a meaning of the experience data of the service granularity and a method for obtaining service experience data by the network data analytics device are consistent with those of the first service experience data in steps S201 and S301. For details, refer to the description in step S201.

(2) The first network element determines, based on the first network experience data, whether the network satisfies the network quality requirement.

The first network element compares the first network experience data with the network quality requirement that has been stored in the first network element, to determine whether the network satisfies the network quality requirement. Further, when the experience data, included in the first network experience data, of the network granularity cannot satisfy a network quality requirement of the network granularity, for example, the first network experience data shows that the quantity of online users in the network is less than 1 million, or when the experience data, included in the first network experience data, of the service granularity cannot satisfy a network quality requirement of the service granularity, for example, the first network experience data shows that the MOS of the service A in the network is less than 3, the first network element determines that the network cannot satisfy the network quality requirement.

Optionally, when the first network experience data and the network quality requirement are different data types, the first network element converts a data type of the first network experience data into a data type of network quality requirement data, and then performs comparison. For example, the first network experience data includes three types of latency information: a core network latency, an access network latency, and a latency on an N6 interface, and a data type of the network quality requirement includes only a network latency. The first network element converts data types of the foregoing three types of latency information into the data type of the network quality requirement. That is, the first network element converts the three types of latency information into an integrated latency, and then compares the first network experience data with the network quality requirement data.

A specific method for determining, by the first network element, that the status reflecting how the network satisfies the network quality requirement is less than the preset value may include but is not limited to the following manner:

(1) The first network element receives first network experience data from the network data analytics device.

For example, for a description of the first network experience data, refer to step (1) in the method for determining, by the first network element, whether the network satisfies the network quality requirement. Details are not described herein again.

(2) The first network element determines, based on the first network experience data, that the status reflecting how the network satisfies the network quality requirement is less than the preset value.

A comparison value of the network quality requirement is preset in the first network element. The comparison value may be a positive comparison value or a negative comparison value of an actual network quality requirement. That is, a network quality requirement shown by the comparison value may be higher than the actual network quality requirement, or may be lower than the actual network quality requirement. For example, the preset comparison value may be 120%×the actual network quality requirement or 80%× the actual network quality requirement.

The first network element compares the first network experience data with the preset comparison value of the network quality requirement, thereby determining whether the status reflecting how the network satisfies the network quality requirement is less than the preset value. Further, when the experience data, included in the first network experience data, of the network granularity cannot satisfy a preset comparison value corresponding to a network granularity quality requirement, for example, if the network tenant requires that a maximum quantity of online users in the network may reach 1 million, but the preset comparison value in the first network element is 800000, and the first network experience data shows that the maximum quantity of online users in the network is less than 800000, or when the experience data, included in the first network experience data, of the service granularity cannot satisfy a preset comparison value corresponding to a network quality requirement of the service granularity, for example, if the network tenant requires that the MOS of the service A in the network be 3, but the preset comparison value in the first network element is 2.4, and the first network experience data shows that the MOS of the service A in the network is less than 2.4, the first network element determines that the status reflecting how the network satisfies the network quality requirement is less than the preset value.

It should be noted that a manner of obtaining or setting the preset comparison value of the network quality requirement in the first network element is not limited in this application. For example, the preset comparison value may be sent by the network tenant or the service server to the first network element, or may be configured by the network carrier in the first network element.

It should be noted that, before the first network element determines, based on the first network experience data, that the network cannot satisfy the network quality requirement or the status reflecting how the network satisfies the network quality requirement is less than the preset value, the method may further include the following step.

The first network element performs access user quantity control on the network, that is, controls or adjusts a quantity of access users in the network. For example, the first network element controls or adjusts the quantity of registered subscribers in the network and/or the quantity of online users in the network.

Further, in a possible design, the first network element controls or adjusts the quantity of access users in the network based on historical network quality data. The historical network quality data is network quality data generated in the network before a control or adjustment action, and may be obtained from the network data analytics device. A meaning and content of the historical network quality data and a method for obtaining the historical network quality data are similar to those of the first network experience data, except that there may be a sequential relationship in terms of time. The historical network quality data includes user quantity information. The historical user quantity information includes the quantity of registered subscribers in the network and/or the quantity of online users in the network.

That the first network element controls the quantity of access users in the network based on historical network quality data may refer to setting the quantity of access users in the network based on the quantity of registered subscribers or the quantity of online users that is included in the historical network quality data. That the first network element adjusts the quantity of access users in the network based on historical network quality data means that the first network element increases or decreases the quantity of registered subscribers in the network or the quantity of online users in the network based on the historical network quality data.

In another possible design, the first network element controls or adjusts the quantity of access users in the network based on user quantity information sent by the network management device. The user quantity information sent by the network management device includes the quantity of registered subscribers in the network and/or the quantity of online users in the network.

It should be noted that step S1000 is an optional step. In some possible designs, a subsequent step such as S1001 is based on step S1000. To be specific, the subsequent step such as S1001 is performed only when step S1000 occurs. However, in some other possible designs, the subsequent step S1001 does not depend on step S1000. To be specific, step S1001 may be performed regardless of whether step S1000 occurs.

S1001: The first network element sends first indication information to the network management device, where the first indication information is used to indicate the status reflecting how the network satisfies the network quality requirement. Correspondingly, a network management network element receives the first indication information sent by the NSSF.

In this embodiment of this application, how the first indication information is used to indicate the status reflecting how the network satisfies the network quality requirement is not limited, provided that the first indication information can reflect a degree to which the network satisfies the network quality requirement. In some possible designs, the first indication information may indicate only whether the network satisfies the network quality requirement. For example, the first indication information may be a one-bit binary value 0 or 1, where 0 indicates that the network does not satisfy the network quality requirement, and 1 indicates that the network satisfies the network quality requirement. In some other possible designs, the first indication information may further indicate the degree to which the network satisfies the network quality requirement. For example, the first indication information may be a percentage value (80% or 120%). The percentage value is used to indicate a percentage value of meeting the network quality requirement by the network. In some other possible designs, the first indication information may alternatively be the first network experience data received by the first network element from the network data analytics device. For example, the first indication information includes a quantity of online users in a network slice 1, the MOS of the service A, a proportion of a quantity of users whose MOS of the service A is greater than 3 and less than 4 to the total quantity of users of the service A, and a service latency of a service B.

In some possible designs, if step S1000 occurs, the first indication information sent by the first network element to the network management network element in step S1001 is used to indicate that the network does not satisfy the network quality requirement (for example, 0) or specific satisfaction degree information (for example, 80%) of the network for the network quality requirement, or the first indication information is the first network experience data.

S1002: Optionally, the network management device sends third request information to the network data analytics device, where the third request information is used to request second network experience data. Correspondingly, the network data analytics device receives the third request information sent by the network management network element.

It should be noted that a time sequence between step S1002 and step S1001 is not limited in this application. That is, S1002 may occur before step S1001. That is, S1002 is independent of step S1001. Alternatively, S1002 may occur after step S1001. That is, step S1002 may be performed by the network management device based on the first indication information sent by the first network element.

A property and a meaning of second network experience data are similar to the meaning and the property of the first network experience data in step S1001. "First" and "second" are used to differentiate between network experience data obtained by different devices from the network data analytics device. Specific content and values of the second network experience data and the first network experience data may be different or may be the same. This is not limited.

In some possible designs, the second network experience data includes experience data of the network granularity. That is, the experience data is data that describes an overall network experience status, for example, the total quantity of registered subscribers in the network or the total quantity of online users in the network, a network latency, and network load information.

In some other possible designs, the second network experience data includes experience data of the service granularity. That is, the experience data is data that describes a service experience status in the network, for example, the total quantity of users of the service A in the network, the MOS of the service A, and the proportion of the quantity of users whose MOSs of the service A are greater than 3 to the total quantity of users of the service A. Specific content and a meaning of the experience data of the service granularity and a method for obtaining service experience data by the network data analytics device are consistent with those of the first service experience data in steps S201 and S301. For details, refer to the description in step S201.

In some possible designs, the third request information may include network identification information of the network, and the third request information is used to request second network experience data corresponding to the network identification information. The network identifier information is used to uniquely identify a network. For example, when the network is a network slice, the third request information includes identification information of the network slice, for example, NSSAI, S-NSSAI, an NSI, and an NSSI.

In some possible designs, the third request information may further include service identification information of one or more services in the network, and the third request information is used to request second network experience data corresponding to the one or more pieces of service identification information. The service identification information is used to uniquely identify a service. For example, the identification information of the service may be service type information or a global identifier of the service.

In some possible designs, the third request information may further include time information. That is, the third request information is used to obtain second network experience data corresponding to the time information. A specific form of the time information is not limited in this embodiment of this application. For example, the time information may be an absolute time, for example, from 00:00 on Jan. 1, 2017 to 24:00 on Jan. 30, 2017, or may be relative time information, for example, a month before a time at which the third request information is sent to the time at which the third request information is sent. A granularity of the time information may be an hour, or may be a minute or a day. This is not limited in this embodiment of this application. In addition, the time information may further include time interval information used to indicate of reporting the second network experience data. For example, the network data analytics device is requested to send the second network experience data to the network management device every five minutes.

Optionally, in some embodiments, the third request information may further include location information. That is, the third request information is used to request second network experience data corresponding to the location information. A specific form of the location information is not limited in this embodiment of this application. The location information may be location information defined in a 3GPP communications network (referred to as communications network location information for short below), for example, a serving cell A or a registration area B. Alternatively, the location information may be location information defined in a non-3GPP communications network. For example, the location information is a specific geographical location range (for example, latitude and longitude or Global Positioning System (GPS) location information, referred to as geographical location information for short below).

Optionally, in some embodiments, the third request information may further include service description information of at least one service in the network. That is, the third request information is used to request second network experience data corresponding to the service description information of the at least one service. The service description information may include one or more of the following information: a service identifier to which a service flow belongs, IP filtering information, a media bandwidth requirement, traffic routing information, a jitter buffer requirement, a media coding type requirement, a media coding rate requirement, a TCP congestion window requirement, a TCP receive window requirement, a buffer requirement, and a requirement on a value of at least one data type.

Optionally, in some embodiments, the third request information may further include data network name (DNN) information corresponding to the network. That is, the third request information is used to request second network experience data corresponding to the DNN information.

It may be understood that the time information, the location information, the network identification information, the service identification information, and the like in the third request information is used to indicate, to the network data analytics device, filtering information or a reporting condition for sending the second network experience data.

Further, the third request information may be subscription request information. In this case, the network data analytics device sends the second network experience data to the network management device after a reporting condition included in the subscription request information is satisfied. Alternatively, the third request information may be real-time request information. In this case, the network data analytics device immediately sends the second network experience data to the network management device.

S1003: Optionally, the network data analytics device sends the second network experience data to the network management device. Correspondingly, the network management device receives the second network experience data sent by the network data analytics device.

In some possible designs, the network data analytics device sends the second network experience data to the network management device based on the third request information in step S1002. That is, the network data analytics device sends the second network experience data to the network management device based on the filtering information or the reporting condition that is included in the third request information. For example, when the third request information includes the time information, the time information is used to indicate that the third request information is used to request the second network experience data corresponding to the time information. In this case, experience data, sent by the network data analytics device to the network management device, of the network is the second network experience data corresponding to the time information. Application of other filtering information or reporting conditions are similar to that in the example. Details are not described herein again.

In some other possible designs, the network data analytics device may send the second network experience data to the network management device without depending on the third request information in step S1002. That is, the network data analytics device may actively send the second network experience data to the network management device on a premise that the third request information sent by the network management device is not received.

In some possible designs, the network data analytics device may further send network identification information of the network to the network management device, where the network identification information corresponds to the second network experience data, and the network identification information is used to uniquely identify a network. For example, when the network is a network slice, the network data analytics device may further send identification information of the network slice to the network management device, for example, NSSAI, S-NSSAI, an NSI, and an NSSI.

In some possible designs, the network data analytics device may further send service identification information of one or more services to the network management device, where each piece of service identification information corresponds to service experience data of each service in the second network experience data, and each piece of service identification information is used to uniquely identify a service. For specific content and a meaning of the service experience data of each service, refer to the first service experience data in the embodiments in FIG. 2 and FIG. 3.

In some possible designs, the network data analytics device may further send time information to the network management device. For example, for a description of the time information, refer to the description of the time information in step S1002. Details are not described herein again.

In some possible designs, the network data analytics device may further send location information to the network management device. For example, for a description of the location information, refer to the description of the location information in step S1002. Details are not described herein again.

In some possible designs, the network data analytics device may further send DNN information to the network management device. For example, for a description of the DNN information, refer to the description of the DNN information in step S1002. Details are not described herein again.

It should be noted that the network identification information, the service identification information, the time information, the location information, the DNN information, and the like may be used as the filtering information or the reporting condition to be sent to the network management device together with the second network experience data. However, whether these conditions are included in the second network experience data is not limited in this application. That is, the filtering information or the reporting condition may be sent to the network management device as a part of the second network experience data, or may be separately sent to the network management device without being used as content of the second network experience data.

S1004: The network management device adjusts a network resource of the network based on the first indication information and/or the second network experience data such that the network can satisfy the network quality requirement.

In some possible designs, that the network can satisfy the network quality requirement means that the network can satisfy the quality requirement of the network granularity.

In some other possible designs, that the network can satisfy the network quality requirement means that a service in the network can satisfy the quality requirement of the service granularity, that is, at least one service in the network can satisfy a corresponding service quality requirement. Such designs have a similar meaning to that the network management device adjusts the network to enable the service in the network to satisfy the first service quality requirement of the service in the embodiment in FIG. 3. For details, refer to the embodiment in FIG. 3. Details are not described herein again.

In some possible designs, the network management device may determine, based on the first indication information sent by the first network element, whether to adjust the network resource. In some other possible designs, after receiving the first indication information sent by the first network element, the network management device further needs to determine, based on the second network experience data sent by the network data analytics device, whether to adjust the network resource.

Further, that the network management device adjusts a network resource of the network based on the first indication information and/or the second network experience data includes determining, by the network management device based on the first indication information and/or the second network experience data, that the network cannot satisfy the network quality requirement, or determining, by the network management device based on the first indication information and/or the second network experience data, that the degree to which the network satisfies the network quality requirement is less than the preset value, and adjusting, by the network management device, the network resource of the network.

A method for adjusting, by the network management device, the network resource of the network includes sending, by the network management device, network resource adjustment notification information to an access network device or a core network device, and adjusting, by the corresponding access network device or core network device, a corresponding network resource based on the resource adjustment notification information, where the access network device includes an access network management device, and the core network device includes a core network management device.

In a possible design, the network resource adjustment notification information includes resource adjustment policy information. That is, in such a design scenario, the network management network element first formulates a resource adjustment policy, and then notifies the access network device or the core network device to adjust the network according to the resource adjustment policy. For example, the resource adjustment policy information may be similar to the second network data set in the embodiment in FIG. 2 or FIG. 3. That is, when the network is in a state corresponding to any second network data, the network can satisfy the network quality requirement. That is, the network can satisfy a service quality requirement corresponding to at least one service in the network. For details about how the network management device generates the resource adjustment policy information similar to the second network data set, refer to the embodiment in FIG. 3. For such the design scenario, the following describes how the network management network element generates the resource adjustment policy information similar to the second network data set.

Further, the network management device establishes a network experience model based on the network quality requirement of the network, the second network experience data, and first network data, that is, establishes a relationship between the second network experience data and the corresponding first network data, thereby determining each piece of second network data based on the relationship. The plurality of pieces of determined second network data form the second network data set. For example, the network management device performs model training based on the network quality requirement, a large amount of second network experience data, and a large amount of first network data, to obtain the network experience model, and determine the second network data set based on the network experience model. The second network experience data is network experience data generated at a historical time and received by the network management device from the network data analytics device, and the first network data is network data generated by the network at the historical time corresponding to the second network experience data. In this case, the second network data is network data obtained by the network management device through calculation or derivation based on the second network experience data and the first network data, and the second network data is to be used as a policy or basis for adjusting or setting the network.

For example, first, the network management device may obtain a relational model of the second network experience data and the first network data based on a linear regression method. For example, the network experience model includes a plurality of service experience sub-models below:

$$g_i(y) = m_{i0}y_0 + m_{i1}y_1 + m_{i2}y_2 + m_{i3}y_3 + \ldots + m_{iD}y_D. \quad (2)$$

In the formula (2), $g_i(y)$ is first service experience data of an $i^{th}$ service in the network, for example, a proportion of a quantity of users whose MOSs of a voice service are greater than 3, where the second network experience data includes first service experience data of all services in the network. $Y=(y_1, y_2, y_3, \ldots, y_D)$, and the eigenvector is first network data corresponding to first service experience data of the $i^{th}$ service, that is, a first parameter of network performance. For example, $y_1$ represents an uplink packet loss rate of an NG RAN, $y_2$ represents an average air interface delay, $y_3$ represents an average quantity of registered subscribers on an AMF, $\ldots$, $y_D$ represents uplink/downlink usage on the N6 interface, and $y_0$ is a constant 1. $M=(m_{i0}, m_{i1}, m_{i2}, m_{i3}, \ldots, m_{iD})$, is a parameter vector, and is also referred to as a weight vector identifier. $m_{ik}$ represents a value of a weight of impact from a $k^{th}$ parameter in the first network data on a first service experience data set of the $i^{th}$ service.

The linear regression refers to an example of the data analytics algorithm. The network data analytics device may obtain the network experience model based on another algorithm. This is not limited in the present disclosure.

Then, the network management device determines, based on the network experience model, a value of an eigenvector corresponding to the network quality requirement, that is, obtains the second network data set. For example, the model $g(y)$ is known, and according to value requirements of $g(y)$ (which includes value sub-requirements corresponding to a plurality of services in the network), for example, that the quantity of online users in the network is greater than 1 million, that the proportion of the quantity of users whose MOSs of service A are greater than 3 to the total quantity of users of service A is greater than 80%, that the MOS of the service A is greater than 3, and that a proportion of a quantity of users whose MOSs of the service B are greater than 4 to a total quantity of users of the service B is required to be greater than 90%, a value combination of $Y=(y_1, y_2, y_3, \ldots, y_D)$ corresponding to these requirements is obtained. For another example, the model $g(y)$ is known, and a value combination $Y=(y_1, y_2, y_3, \ldots, y_D)$ corresponding to a time and a location is obtained based on a value requirement of $g(y)$.

The determining, based on the network experience model, a value of an eigenvector corresponding to the network quality requirement belongs to an MCDM problem. The network management device may obtain the value of the eigenvector based on an existing MCDM method, that is, obtain the second network data set. In general, a combination of a plurality of sets of eigenvectors that satisfy the network quality requirement may be obtained. That is, a combination of a plurality of sets of second network data may be obtained.

In another possible design, the network resource adjustment notification information may not include resource adjustment policy information. That is, in such a design scenario, the access network device or the core network device determines how to adjust the network resource, and the network management network element does not need to determine, in advance, how to adjust the network resource. That is, the network management network element does not need to learn, in advance, of second network data that satisfies the network quality requirement. However, after the network is adjusted using this design procedure, the network can finally reach a state in which the network quality requirement is satisfied. That is, the network is in a state similar to the state corresponding to the second network data in the embodiment in FIG. 2 or FIG. 3.

In the procedure of this embodiment, the first indication information sent by the first network element is used as a trigger condition to trigger the network management network element to adjust the network resource. That is, this embodiment provides a method in which a control plane network element triggers a management plane network element to adjust the network, that is, a serial implementation method in which first, the network is monitored and a quantity of users in the network is adjusted in a control plane, and then the network resource is adjusted in a management plane. A method for adjusting the network resource in the management plane is similar to the method in the embodiment in FIG. 3. A difference lies only in that different services in the network are used as granularities for description in the embodiment in FIG. 3, but the network (for example, a network slice) is used as a granularity for description in this embodiment.

Figure 11:
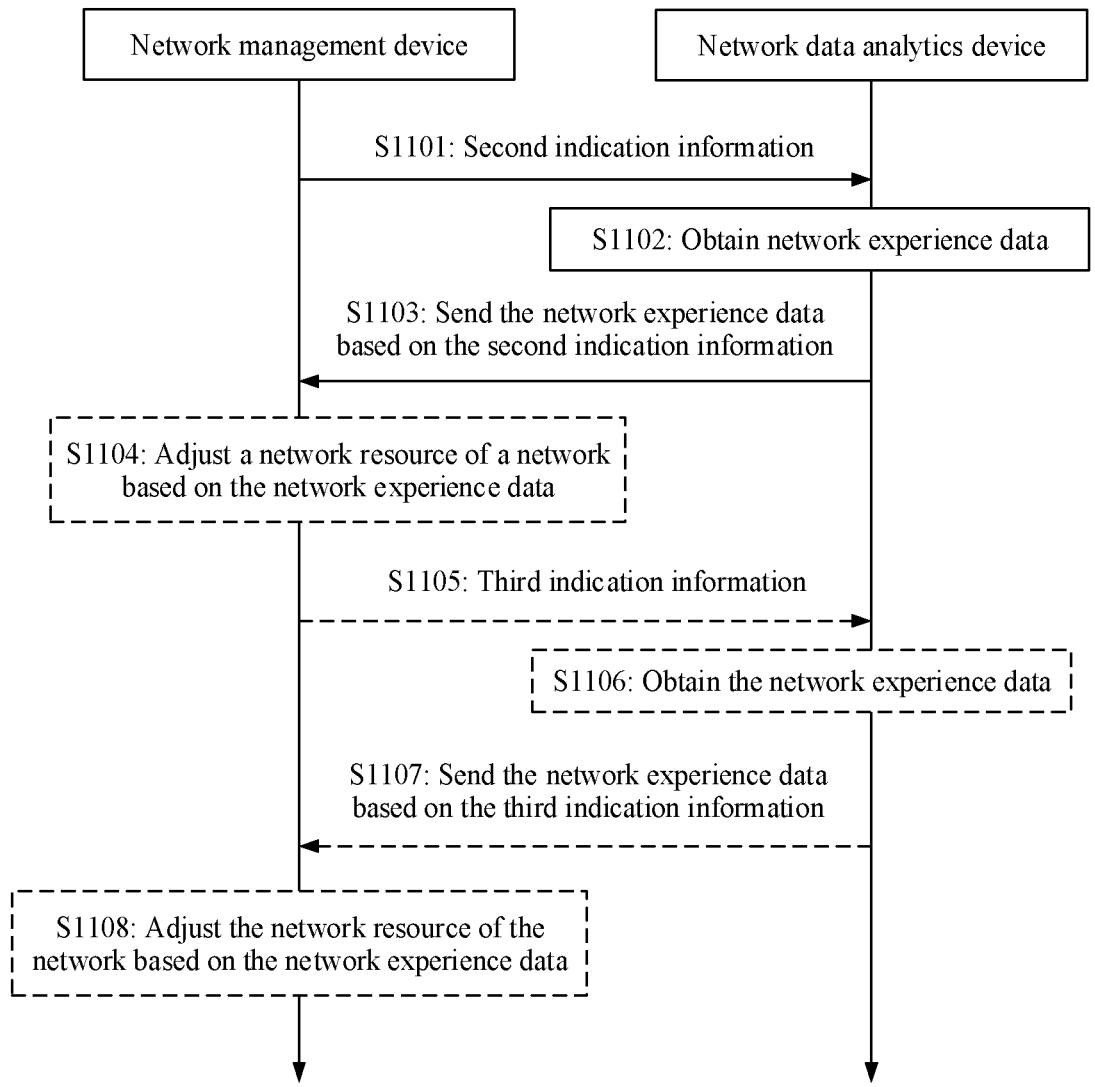
FIG. 11 is a schematic flowchart of a resource management method according to an embodiment of this application.

FIG. 11 is a schematic flowchart of a resource management method according to an embodiment of this application. Referring to FIG. 11, the method includes the following several steps.

S1101: A network management device sends second indication information to a network data analytics device, where the second indication information is used to indicate, to the network data analytics device, that a network is a newly established network or a network is in a test phase, or the second indication information is used to indicate, to the network data analytics device, fifth time information for reporting network experience data. Correspondingly, the network data analytics device receives the second indication information sent by the network management device.

The network management device may learn, using configuration information of the network management device or from a network tenant or a service server, that the network is the newly established network or the network is in the test phase.

Optionally, after the network management device determines that the network is the newly established network or the network is in the test phase, the network management device sets the fifth time information based on the network state, and enables the fifth time information to be included in the second indication information. The fifth time information may include one piece of time interval information and/or one piece of time range information. For example, a time interval is 5 minutes, and a time range is from Jan. 1 to Jan. 31, 2018. That is, the second indication information is used to indicate to report network experience data of January 2018, and a reporting time interval is 5 minutes. In general, to enable the network management device to obtain the network experience data in time, to monitor and adjust the network in the test phase in real time relatively, the fifth time information is usually set to be a relatively short time interval or a relatively small time range.

A meaning and content of the network experience data in this embodiment are the same as those of the second network experience data in the embodiment in FIG. 10. Details are not described herein again.

A method for sending the second indication information by the network management device to the network data analytics device includes. The network management device may directly or indirectly send the second indication information to the network data analytics device. That is, the network management device may directly send the second indication information to the network data analytics device, or send the second indication information to the network data analytics device using an intermediate device.

In some possible designs, the second indication information may be used to indicate that the network is the newly established network or the network is in the test phase. In some possible designs, the second indication information may be directly the fifth time information for reporting the network experience data. In some other possible designs, the second indication information may have both the foregoing two indication functions. To be specific, the second indication information is used to indicate that the network is the newly established network or the network is in the test phase, and the second indication information is used to indicate the fifth time information for reporting the network experience data. It should be noted that the second indication information in this step is actually used to help the network data analytics device determine filtering information or a reporting condition for subsequently reporting the network experience data, for example, determine time information, location information, network identification information, or service identification information for reporting the network experience data.

The following describes, using an example in which the filtering information, that is, the time information, is determined based on the second indication information, how the second indication information helps the network data analytics device determine the filtering information for reporting the network experience data. For example, if the network data analytics device learns, based on the second indication information, of that a network slice is in a test phase, the network data analytics device determines to shorten a reporting time interval of the network experience data, for example, shorten the reporting time interval from normal one month to five days. This helps the network management device obtain latest network experience data, to monitor and adjust a resource of the network slice based on the network experience data in time, thereby better guaranteeing service quality of the network slice. For how the network management device further monitors and adjusts the resource of the network slice based on the network experience data, refer to the embodiment in FIG. 3 or the embodiment in FIG. 10. Details are not described herein again.

The foregoing merely briefly describes the effect and the function of the second indication information using an example. For a specific operation method after the network data analytics device obtains the second indication information, refer to the following operation steps S1102 and S1103.

In some possible designs, the second indication information may be sent to the network data analytics device through a subscription request message, where the subscription request message is used to request to subscribe to the network experience data from the network data analytics device. Optionally, the subscription request message may further include a subscription reporting condition in addition to the second indication information. The subscription reporting condition is used to indicate, to the network data analytics device, a trigger occasion, specific filtering information, or the like for reporting the network experience data, for example, reporting network experience data related to some areas in the network or reporting network experience data related to some services. If the second indication information includes the fifth time information, it may be considered that the fifth time information also belongs to the subscription reporting condition.

S1102: The network data analytics device obtains the network experience data.

Further, the network experience data in this step is equivalent to the second network experience data in the embodiment in FIG. 10. For how the network data analytics device obtains the network experience data herein, refer to the method for obtaining the second network experience data by the network data analytics device in the embodiment in FIG. 10. Details are not described herein again.

Optionally, based on the method for obtaining network experience data by the network data analytics device, the network data analytics device may further obtain the network experience data based on the second indication information. That is, the second indication information further needs to be considered when the network data analytics device obtains the network experience data. Details are as follows.

After learning, based on the second indication information, of that the network is the newly established network or is in the test phase or the fifth time information for reporting the network experience data, the network data analytics device determines sixth time information, where the sixth time information is used to limit a time interval and/or a time range for obtaining the training data from another network element. The network data analytics device obtains the training data from the other network element based on the sixth time information, to obtain the network experience data.

It should be noted that the training data in this step is prior or historical data used for training or calculating network experience data. For example, the training data may include at least one of the following types of data: historical experience data of a network granularity, historical experience data of a service granularity, historical experience data of a user granularity, network identification information, location information corresponding to the training data, time information corresponding to the training data, data network name information corresponding to the training data, and the like. The historical experience data of the network granularity is historical data used to represent overall network experience such as a historical quantity of online users in the network or a historical quantity of registered subscribers in the network and a historical network latency. The historical experience data of the service granularity is historical data used to represent service granularity experience such as a historical MOS of a service A and a proportion of users whose historical MOSs of the service A are greater than an average MOS of the service A. The historical experience data of the user granularity is historical data used to represent service experience of a single user in the network, for example, a MOS of the service A of a user 1 and a service latency of a service B of the user 1.

The network experience data in this step is equivalent to the second network experience data in the embodiment in FIG. 10. For a specific method for obtaining the network experience data by the network data analytics device based on the training data, refer to the method for obtaining the second network experience data by the network data analytics device in the embodiment in FIG. 10.

In some possible designs, when the network data analytics device learns, based on the second indication information, of that the network is the newly established network or is in the test phase, the network data analytics device may determine the sixth time information. For example, for a slice network in a test phase, the network data analytics device determines to obtain the training data every five days to obtain the network experience data. In this case, the network data analytics device may request a corresponding network element to report the training data every five days, or the network data analytics device requests, every five days, a corresponding network element to send training data. A specific method for setting the sixth time information and a specific value of the sixth time information are not limited in this design.

In some other possible designs, the network data analytics device determines the sixth time information based on the fifth time information in the second indication information. The sixth time information may be the same as or different from the fifth time information. This is not limited in this design. For example, in some implementations, the network data analytics device sets a value of the sixth time information to a value of the fifth time information. For example, if the fifth time information requires the network data analytics device to report the network experience data every five days, the network data analytics device obtains the training data from the other network element every five days to obtain to-be-reported network experience data. In some other possible implementations, the network data analytics device sets the sixth time information based only on the fifth time information, but the sixth time information is different from the fifth time information. For example, if the fifth time information requires the network data analytics device to report the network experience data every five days, the network data analytics device obtains the training data from the other network element every day to obtain to-be-reported network experience data.

It should be noted that, in addition to the foregoing method in which the network data analytics device determines the sixth time information based on the second indication information and obtains the network experience data based on the sixth time information, there may be another method in which the network data analytics device obtains the network experience data based on the second indication information.

In some possible designs, the network data analytics device determines sixth location information based on the second indication information, and obtains the network experience data based on the sixth location information. The sixth location information includes one or more of the following location area information: an entire network, at least one registration area list, and at least one cell list. For example, network experience data corresponding to all registration areas in the network is obtained based on the second indication information.

In some possible designs, the network data analytics device determines sixth network identification information based on the second indication information, and obtains the network experience data based on the sixth network identification information. For example, network experience data corresponding to a network slice 1 is obtained based on the second indication information.

In some possible designs, the network data analytics device determines sixth service identification information based on the second indication information, and obtains the network experience data based on the sixth service identification information. For example, network experience data corresponding to services identified using all service identifiers in the network is obtained based on the second indication information.

In some possible designs, the network data analytics device determines sixth data network name information based on the second indication information, and obtains the network experience data based on the sixth data network name information. For example, network experience data corresponding to all DNNs in the network is obtained based on the second indication information.

It may be considered that one or more pieces of the sixth time information, the sixth location information, the sixth network identification information, the sixth service identification information, and the sixth data network name information are used as filtering information for obtaining the training data by the network data analytics device. The network data analytics device determines the filtering information based on the second indication information, and obtains the training data based on the filtering information, to obtain the network experience data.

S1103: The network data analytics device sends the network experience data to the network management device based on the second indication information. Correspondingly, the network management device receives the network experience data sent by the network data analytics device.

Optionally, before sending the network experience data to the network management device, the network data analytics device further needs to determine, based on the second indication information, seventh time information for reporting the network experience data.

Further, in some possible designs, the second indication information is used to indicate that the network is the newly established network or the network is in the test phase. After obtaining the second indication information, the network data analytics device determines, based on the second indication information, the seventh time information for subsequently reporting the network experience data to the network management device. In some implementations, the seventh time information may be time interval information for reporting the network experience data. For example, the network data analytics device reports the network experience data to a network management network element every five minutes. In some other designs, the seventh time information may be time range information for reporting the network experience data. For example, the network data analytics device reports network experience data of past/future five days or reports network experience data of Jan. 1 to Jan. 5, 2018.

Further, when the network data analytics device learns, using the second indication information, of that the network is the newly established network or the network is in the test stage, the network data analytics device may determine the seventh time information. Subsequently, the network data analytics device reports the network experience data to the network management device based on the seventh time information. For example, the seventh time information may be set to be a relatively short time interval or a relatively small time range such that the network data analytics device reports the network experience data to the network management device at a relatively high frequency. This can ensure that the network management device can obtain the network experience data in real time relatively, to facilitate subsequent network experience monitoring and network resource adjustment, thereby improving accuracy of network adjustment and setting.

In some possible designs, the second indication information may be directly the fifth time information for reporting the network experience data. The fifth time information may be one piece of time interval information and/or one piece of time range information. After receiving the second indication information, the network data analytics device reports the network experience data to the network management device based on the time interval information and/or the time range information included in the second indication information. In general, if the network is the newly established network or is in the test phase, the fifth time information may be a relatively short time interval or a relatively small time range. For example, the network management device may directly indicate the network data analytics device to report the network experience data every five minutes and/or indicate the network data analytics device to report network experience data of only the past five days such that the network data analytics device can report the network experience data to the network management device at a relatively high frequency. This ensures that the network management device can obtain the network experience data in real time relatively, to facilitate subsequent network experience monitoring and network resource adjustment, thereby improving accuracy of network adjustment and setting. The network data analytics device determines the seventh time information based on the fifth time information in the second indication information. The seventh time information may be the same as or different from the fifth time information. This is not limited in this design.

It should be noted that the seventh time information may be the same as or different from the sixth time information in step S1102. This is not limited herein.

It should be noted that, in addition to the foregoing method in which the network data analytics device determines, based on the second indication information, the seventh time information for reporting the network experience data, and reports the network experience data based on the seventh time information, there may be another method in which the network data analytics device reports the network experience data based on the second indication information.

For example, in some possible designs, the network data analytics device determines seventh location information based on the second indication information, and reports the network experience data based on the seventh location information. That is, the network data analytics device reports network experience data corresponding to the seventh location information. The seventh location information includes one or more of the following location area information: an entire network, at least one registration area list, and at least one cell list. It should be noted that the seventh location information may be the same as or different from the sixth location information in step S1102. This is not limited herein.

For another example, in some possible designs, the network data analytics device determines seventh network identification information based on the second indication information, and reports the network experience data based on the seventh network identification information. That is, the network data analytics device reports network experience data corresponding to the seventh network identification information. For example, network experience data corresponding to a network slice 1 is reported based on the second indication information. It should be noted that the seventh network identification information may be the same as or different from the sixth network identification information in step S1102. This is not limited herein.

For another example, in some possible designs, the network data analytics device determines seventh service identification information based on the second indication information, and reports the network experience data based on the seventh service identification information. That is, the network data analytics device reports network experience data corresponding to the seventh service identification information. For example, network experience data corresponding to services identified using all service identifiers in the network is reported based on the second indication information. It should be noted that the seventh service identification information may be the same as or different from the sixth service identification information in step S1102. This is not limited herein.

In some possible designs, the network data analytics device determines seventh data network name information based on the second indication information, and reports the network experience data based on the seventh data network name information. For example, network experience data corresponding to all DNNs in the network is reported based on the second indication information. It should be noted that the seventh data network name information may be the same as or different from the sixth data network name information in step S1102. This is not limited herein.

It may be considered that the seventh time information, the seventh location information, the seventh network identification information, the seventh service identification information, and the seventh data network name information may be used as reporting filtering information for sending the network experience data to the network management device by the network data analytics device. The network data analytics device determines the reporting filtering information based on the second indication information, and sends the network experience data based on the reporting filtering information. Optionally, when sending the network experience data to the network management device, the network data analytics device may further send the filtering information to the network management device. However, whether the filtering information is used as a part of the network experience data is not limited in this application. That is, the filtering information may be included inside or outside the network experience data.

For a specific method for sending the network experience data to the network management device by the network data analytics device, refer to the method for sending the second network experience data to the network management device by the network data analytics device in the embodiment in FIG. 10. Details are not described herein again.

In addition to the method described in the foregoing steps, optionally, this embodiment of this application may further include the method described in one or more steps below.

S1104: The network management network element adjusts a network resource of the network based on the network experience data sent by the network data analytics device such that the network can satisfy a network quality requirement.

The method in this step is similar to the method for adjusting, by the network management device, the network resource based on the first network experience data in the embodiment in FIG. 10. For details, refer to the method in the embodiment in FIG. 10. Details are not described herein again.

It should be noted that, the method herein may also be similar to the method in the embodiment in FIG. 10. Optionally, when the network management device adjusts the network resource based on the network experience data, first indication information obtained from a first network element further needs to be considered. For details, refer to the embodiment in FIG. 10.

S1105: The network management device sends third indication information to the network data analytics device, where the third indication information is used to indicate, to the network data analytics device, that the network enters a stable phase or that the network completes the test phase, or the third indication information is used to indicate, to the network management device, eighth time information for reporting the network experience data. Correspondingly, the network data analytics device receives the third indication information sent by the network management device.

The network management device may learn, using the configuration information of the network management device or from the network tenant or the service server, of that the network enters the stable stage or the network completes the test phase.

Optionally, after the network management device determines that the network enters the stable phase or the network completes the test phase, the network management device sets the eighth time information based on the network state, and enables the eight time information to be included in the third indication information. The eighth time information may include one piece of time interval information and/or one piece of time range information. For example, a time interval is one day, and a time range is from Jan. 1, 2018 to Mar. 31, 2018. That is, the third indication information is used to indicate to report network experience data of the first quarter of 2018, and a reporting time interval is one day. In general, the eighth time information may be set to a relatively long time interval or a relatively large time range such that the network data analytics device reports the network experience data to the network management device at a relatively low frequency. In this way, the network data analytics device can be prevented from frequently performing an interaction operation with the network management device, and even the eighth time information may be set to be an infinite time interval or time range. In this way, the network data analytics device does not send the network experience data to the network management device such that a data throughput of the network and network load are reduced.

In some possible designs, the third indication information may be used to indicate that the network enters the stable phase or the network has completed the test phase. In some possible designs, the third indication information may be directly the eighth time information for reporting the network experience data. In some other possible designs, the third indication information may have both the foregoing two indication functions. To be specific, the third indication information is used to indicate that the network enters the stable phase or the network completes the test phase, and the third indication information is used to indicate the eighth time information for reporting the network experience data.

It may be understood that, when the network is in different phases, the network management device sets different time information for reporting the network experience data, or the network management device indicates the network data analytics device to determine different time information for reporting the network experience data. Therefore, when a status of the network changes, time information for reporting the network experience data also correspondingly changes.

S1106: The network data analytics device obtains the network experience data based on the third indication information.

Further, after learning, based on the third indication information, of that the network enters the stable phase or the network has completed the test phase or the eighth time information for reporting the network experience data, the network data analytics device determines ninth time information, where the ninth time information is used to relimit a time interval and/or a time range for obtaining the training data from the other network element. The network data analytics device obtains the training data from the other network element based on the ninth time information, to obtain the network experience data.

In some possible designs, when the network data analytics device learns, based on the third indication information, that the network enters the stable phase or the network completes the test phase, the network data analytics device may determine the ninth time information. For example, for a slice network in a stable phase, the network data analytics device determines to obtain the training data every month to obtain the network experience data. In this case, the network data analytics device may request a corresponding network element to report the training data every month, or the network data analytics device requests, every month, a corresponding network element to send the training data. A specific method for setting the ninth time information and a specific value of the ninth time information are not limited in this design. However, in general, a time interval or a time range indicated using the ninth time information is greater than that indicated using the sixth time information such that the network data analytics device reports the network experience data to the network management device at a relatively low frequency. In this way, the network data analytics device can be prevented from frequently obtaining the training data or frequently performing an interaction operation with the network management device, and even the ninth time information may be set to be an infinite time interval or time range. In this way, the network data analytics device does not need to obtain the training data or perform an interaction operation with the network management device such that a data throughput of the network and network load are reduced.

In some other possible designs, the network data analytics device determines the ninth time information based on the eighth time information in the third indication information. The ninth time information may be the same as or different from the eighth time information. This is not limited in this design. For example, in some implementations, the network data analytics device sets a value of the ninth time information to a value of the eighth time information. For example, if the eighth time information requires the network data analytics device to report the network experience data every month, the network data analytics device obtains the training data from the other network element every month to obtain to-be-reported network experience data. In some other possible implementations, the network data analytics device sets the ninth time information based only on the eighth time information, but the ninth time information is different from the eighth time information. For example, if the fifth time information requires the network data analytics device to report the network experience data every month, the network data analytics device obtains the training data from the other network element every 10 days to obtain to-be-reported network experience data.

It should be noted that, in addition to the foregoing method in which the network data analytics device determines the ninth time information based on the third indication information and obtains the network experience data based on the ninth time information, there may be another method in which the network data analytics device obtains the network experience data based on the third indication information.

In some possible designs, the network data analytics device determines ninth location information based on the third indication information, and obtains the network experience data based on the ninth location information. The ninth location information includes one or more of the following location area information: an entire network, at least one registration area list, and at least one cell list. For example, network experience data corresponding to only a part of registration areas in the network is obtained based on the third indication information.

In some possible designs, the network data analytics device determines ninth network identification information based on the third indication information, and obtains the network experience data based on the ninth network identification information. For example, the network experience data corresponding to the network slice 1 is obtained based on the third indication information.

In some possible designs, the network data analytics device determines ninth service identification information based on the third indication information, and obtains the network experience data based on the ninth service identification information. For example, network experience data corresponding to a service identified using a part of service identifiers in the network is obtained based on the third indication information.

In some possible designs, the network data analytics device determines ninth data network name information based on the third indication information, and obtains the network experience data based on the ninth data network name information. For example, network experience data corresponding to a part of DNNs in the network is obtained based on the third indication information.

It may be considered that one or more pieces of the ninth time information, the ninth location information, the ninth network identification information, the ninth service identification information, and the ninth data network name information are used as filtering information for obtaining the training data by the network data analytics device. The network data analytics device determines the filtering information based on the third indication information, and obtains the training data based on the filtering information, to obtain the network experience data.

It should be noted that, for details about how the network data analytics device obtains the network experience data, refer to the method for obtaining the network experience data by the network data analytics device in S1102. Details are not described herein again.

It may be understood that, when the network is in different phases, the network data analytics device determines different filtering information or policy information for obtaining the training data, and obtains the training data based on the corresponding filtering information or policy information, to obtain the network experience data based on the training data. That is, when the status of the network changes, the network data analytics device obtains the training data from the other network element using different filtering information or policy information.

S1107: The network data analytics device sends the network experience data to the network management device based on the third indication information. Correspondingly, the network management device receives the network experience data sent by the network data analytics device.

Optionally, before sending the network experience data to the network management device, the network data analytics device further needs to redetermine, based on the third indication information, tenth time information for reporting the network experience data.

Further, in some possible designs, if the third indication information is used to indicate that the network enters the stable phase or the network completes the test phase, the network data analytics device determines, based on the third indication information, the tenth time information for subsequently reporting the network experience data to the network management device. In some implementations, the tenth time information may be time interval information for reporting the network experience data. For example, the network data analytics device reports the network experience data to the network management network element every day. In some other designs, the tenth time information may be time range information for reporting the network experience data. For example, the network data analytics device reports network experience data of past/future five days or reports network experience data of Jan. 1 to Jan. 5, 2018. It should be noted that the tenth time information that is for reporting the network experience data and that is determined based on the third indication information is usually different from the seventh time information that is for reporting the network experience data and that is determined based on the second indication information.

Further, when the network data analytics device learns, using the third indication information, of that the network enters the stable stage or the network completes the test phase, the network data analytics device may redetermine that reporting time information is the tenth time information.

Subsequently, the network data analytics device reports the network experience data to the network management device based on the tenth time information. For example, the tenth time information may be set to a relatively long time interval or a relatively large time range such that the network data analytics device reports the network experience data to the network management device at a relatively low frequency. In this way, the network data analytics device can be prevented from frequently performing an interaction operation with the network management device, and even the tenth time information may be set to be an infinite time interval or time range. In this way, the network data analytics device does not need to perform an interaction operation with the network management device such that a data throughput of the network and network load are reduced. That is, when the network is in different phases, the network data analytics device determines different time information for reporting the network experience data. Therefore, when the status of the network changes, the time information for reporting the network experience data also correspondingly changes.

In some possible designs, the third indication information may be directly the eighth time information for reporting the network experience data. The eighth time information may include one piece of time interval information and/or one piece of time range information. After receiving the third indication information, the network data analytics device reports the network experience data to the network management device based on the time interval information and/or the time range information included in the third indication information. In general, if the network enters the stable phase or the network completes the test phase, the eighth time information may be a relatively long time interval or a relatively large time range. For example, the network management device may directly indicate the network data analytics device to report the network experience data every day and/or indicate the network data analytics device to report network experience data of only the past month such that the network data analytics device can report the network experience data to the network management device at a relatively low frequency, the network data analytics device can be prevented from frequently performing an interaction operation with the network management device, and a data throughput of the network and network load are reduced. Even the eighth time information may be set to be an infinite time interval or time range such that the network data analytics device does not need to obtain the training data or perform an interaction operation with the network management device.

It should be noted that, in addition to the foregoing method in which the network data analytics device determines, based on the third indication information, the tenth time information for reporting the network experience data, and reports the network experience data based on the tenth time information, there may be another method in which the network data analytics device reports the network experience data based on the third indication information.

For example, in some possible designs, the network data analytics device determines tenth location information based on the third indication information, and reports the network experience data based on the tenth location information. That is, the network data analytics device reports network experience data corresponding to the tenth location information. The tenth location information includes one or more of the following location area information: an entire network, at least one registration area list, and at least one cell list. It should be noted that the tenth location information may be the same as or different from the ninth location information in step S1106. This is not limited herein.

For another example, in some possible designs, the network data analytics device determines tenth network identification information based on the third indication information, and reports the network experience data based on the tenth network identification information. That is, the network data analytics device reports network experience data corresponding to the tenth network identification information. For example, network experience data corresponding to the network slice 1 is reported based on the third indication information. It should be noted that the ninth network identification information may be the same as or different from the tenth network identification information in step S1106. This is not limited herein.

For another example, in some possible designs, the network data analytics device determines tenth service identification information based on the third indication information, and reports the network experience data based on the tenth service identification information. That is, the network data analytics device reports network experience data corresponding to the tenth service identification information. For example, network experience data corresponding to a service identified using a part of service identifiers in the network is reported based on the third indication information. It should be noted that the tenth service identification information may be the same as or different from the ninth service identification information in step S1106. This is not limited herein.

In some possible designs, the network data analytics device determines tenth data network name information based on the third indication information, and reports the network experience data based on the tenth data network name information. For example, network experience data corresponding to a part of DNNs in the network is reported based on the third indication information. It should be noted that the tenth data network name information may be the same as or different from the ninth data network name information in step S1106. This is not limited herein.

It may be considered that one or more of the tenth time information, the tenth location information, the tenth network identification information, the tenth service identification information, and the tenth data network name information are used as reporting filtering information for sending the network experience data to the network management device by the network data analytics device. The network data analytics device determines the reporting filtering information based on the third indication information, and sends the network experience data based on the reporting filtering information.

According to the method procedure in this step, after the network data analytics device learns of that the network enters the stable phase from the test phase, the network data analytics device correspondingly changes the filtering information for reporting the network experience data, that is, reports the network experience data to the network management device using different reporting policies. The filtering information/reporting policy includes reporting time information, location information, network identification information, service identification information, data network name information, and the like. In general, the changed filtering information/reporting policy can be used to avoid frequent reporting of the network experience data in a wide geographical range, and even completely avoid reporting of the network experience data, to adapt to a requirement of network quality monitoring or adjustment in the stable stage of the network.

S1108 is the same as the method in S1104.

This embodiment provides a method for exchanging, by the network management device and the network data analytics device, whether the network is in a test state or a stable state, and using different data reporting and data collection methods for the different states. Actually, the method is also applicable to any other two network elements, and may be further summarized as follows:

(1) A first network device (for example, the network management device) determines a network status of the network, where the network status includes a test state or a stable state, the test state is used to indicate that the network is a newly established network or the network is in a test phase, and the stable state is used to indicate that the network is in the stable state or the network completes the test phase, (2) The first network device (for example, the network management device) sends network status indication information (for example, the second indication information in S1101 or the third indication information in S1105) to a second network device (the network data analytics device), where the network status indication information is used to indicate the network status of the network to the second network device, or the network status indication information is used to indicate, to the second network device, time information (for example, the fifth time information in S1101 or the eighth time information in S1105) for reporting data (for example, network experience data), and the time information for reporting the data is determined by the first network device (for example, the network management device) based on the network state.

In addition, correspondingly, (3) The second network device (for example, the network data analytics device) receives the network status indication information.

(4) The second network device (for example, the network data analytics device) reports the data (for example, the network experience data) to the first network device (for example, the network management device) based on the network status indication information.

For details of other methods, refer to the detailed description of the method in the embodiment in FIG. 11, as long as the network management device is replaced with the first network device, the network data analytics device is replaced with the second network device, and data, that is, the network experience data, exchanged between the network management device and the network data analytics device is replaced with data exchanged between the first network device and the second network device.

In addition, it should be noted that, in a possible design, if the second network device can determine whether the network is in the test phase or whether the network is the newly established network, an operation of receiving the network status indication information from the first network device may be omitted. After the second network device determines that the network is in a different network status, the second network device uses a different data reporting policy to report the data to the first network device. For a data reporting method, still refer to the embodiment in FIG. 11.

In the foregoing embodiments provided in this application, the solutions of the resource management methods provided in the embodiments of this application are separately described from a perspective of the network elements and from a perspective of interaction between the network elements. It may be understood that, to implement the foregoing functions, the network elements and devices, such as the first network element, the network management device, the first network device, and the second network device, include corresponding hardware structures and/or software modules for performing the functions. A person skilled in the art should be easily aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12A:
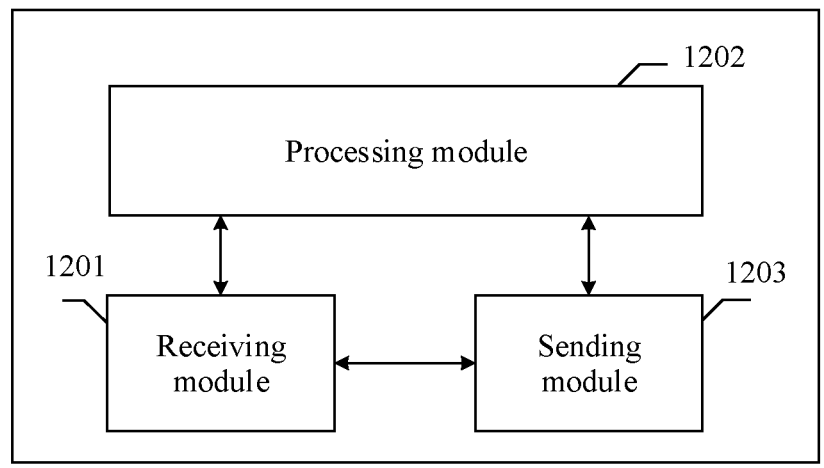
FIG. 12A and FIG. 12B each are a schematic structural diagram of a resource management apparatus according to an embodiment of this application.

For example, when the foregoing network elements implement the corresponding functions using the software modules, a resource management apparatus may include a receiving module 1201, a processing module 1202, and a sending module 1203, as shown in FIG. 12A.

In an embodiment, the resource management apparatus may be configured to perform the operations of the first network element in FIG. 10.

For example: the processing module 1202 is configured to determine a status reflecting how a network satisfies a network quality requirement. The sending module 1203 is configured to send first indication information to a network management device, where the first indication information is used to indicate the status reflecting how the network satisfies the network quality requirement.

Optionally, before the sending module 1203 sends the first indication information to the network management device, the processing module 1202 is further configured to control an access user quantity in the network.

Optionally, the resource management apparatus further includes the receiving module 1201. The receiving module 1201 is configured to receive information about a user quantity from the network management device or a network data analytics device, where the information about the user quantity includes information about a registered subscriber quantity and/or information about an online user quantity. The processing module 1202 controls the access user quantity in the network based on the information about the user quantity.

Optionally, the status reflecting how the network satisfies the network quality requirement includes: the network cannot satisfy the network quality requirement, the status reflecting how the network satisfies the network quality requirement is less than a preset value, or a degree to which the network satisfies the network quality requirement.

Optionally, the receiving module 1201 is configured to receive first network experience data of the network from the network data analytics device, where the first network experience data is used to indicate network service quality. The processing module 1202 is configured to determine, based on the first network experience data, the status reflecting how the network satisfies the network quality requirement.

In addition, the receiving module 1201, the processing module 1202, and the sending module 1203 in the foregoing resource management apparatus can further implement other operations and functions of the first network element in FIG. 10 in the foregoing method. Details are not described herein again.

In another embodiment, the resource management apparatus shown in FIG. 12A may be further configured to perform the operations of the network management device in FIG. 10. For example, the receiving module 1201 is configured to receive first indication information from a first network element, where the first indication information is used to indicate a status reflecting how a network satisfies a network quality requirement. The processing module 1202 is configured to adjust a network resource based on the first indication information.

Optionally, the processing module 1202 is configured to determine, based on the first indication information, that the network cannot satisfy the network quality requirement. The processing module 1202 is configured to adjust the network resource.

Optionally, the receiving module 1201 is configured to receive second network experience data from a network data analytics device, where the second network experience data is used to indicate network service quality. The processing module 1202 is configured to adjust the network resource based on the first indication information and the second network experience data.

Optionally, the processing module 1202 is further configured to obtain the second network experience data based on the first indication information.

In addition, the receiving module 1201 and the processing module 1202 in the foregoing resource management apparatus may further implement other operations or functions of the network management device in FIG. 10 in the foregoing method. Details are not described herein again.

In another embodiment, the resource management apparatus shown in FIG. 12A may be further configured to perform the operations of the network management device in FIG. 10. For example, the receiving module 1201 is configured to receive network experience data from a network data analytics device, where the network experience data is used to indicate network service quality. The processing module 1202 is configured to adjust a network resource based on the network experience data.

Optionally, the network experience data includes experience data of a network granularity and/or experience data of a service granularity, the experience data of the network granularity is used to indicate network service quality of the network granularity, and the experience data of the service granularity is used to indicate network service quality of the service granularity.

Optionally, the receiving module 1201 is further configured to receive first indication information from a first network element, where the first indication information is used to indicate a status reflecting how the network satisfies a network quality requirement.

Optionally, the status reflecting how the network satisfies the network quality requirement includes: the network cannot satisfy the network quality requirement, the status reflecting how the network satisfies the network quality requirement is less than a preset value, or a degree to which the network satisfies the network quality requirement.

Optionally, the processing module 1202 is configured to adjust the network resource based on the first indication information and the network experience data.

Optionally, the processing module 1202 is configured to determine, based on the first indication information, that the network cannot satisfy the network quality requirement. The processing module 1202 is configured to adjust the network resource.

In addition, the receiving module 1201 and the processing module 1202 in the foregoing resource management apparatus may further implement other operations or functions of the network management device in FIG. 10 in the foregoing method. Details are not described herein again.

In another embodiment, the resource management apparatus shown in FIG. 12A may be further configured to perform the operations of the first network device in FIG. 11. For example, the processing module 1202 is configured to determine a network status of a network, where the network status includes a test state or a stable state, the test state is used to indicate that the network is a newly established network or the network is in a test phase, and the stable state is used to indicate that the network is in a stable state or the network completes the test phase. The sending module 1203 is configured to send network status indication information to a second network device, where the network status indication information is used to indicate the network status of the network to the second network device, or the network status indication information is used to indicate, to the second network device, time information for sending data to the first network device, and the time information is determined by the first network device based on the network status.

Optionally, the resource management apparatus further includes the receiving module 1201. The receiving module 1201 is configured to receive the data from the second network device, where the data is sent by the second network device to the resource management apparatus based on the network status indication information.

Optionally, the resource management apparatus includes a network management device.

Optionally, the second network device includes a network data analytics device.

Optionally, the data includes network experience data. The network experience data is used to indicate network service quality.

Optionally, the processing module 1202 is further configured to adjust a network resource based on the network experience data such that the network can satisfy a network quality requirement.

Optionally, the sending module 1203 is configured to send resource adjustment notification information to an access network device or a core network device based on the network experience data, where the resource adjustment notification information is used to notify the access network device or the core network device to adjust the network resource.

In addition, the receiving module 1201, the processing module 1202, and the sending module 1203 in the foregoing resource management apparatus can further implement other operations and functions of the first network device in FIG. 11 in the foregoing method. Details are not described herein again.

In another embodiment, the resource management apparatus shown in FIG. 12A may be further configured to perform the operations of the second network device in FIG. 11. For example, the receiving module 1201 is configured to receive second indication information from a first network device, where the second indication information is used to indicate, to the second network device, that a network is in a first network state, or the second indication information is used to indicate, to the second network device, first time information for sending data to the first network device. The first network state includes a test state or a stable state, the test state is used to indicate that the network is a newly established network or the network is in a test phase, and the stable state is used to indicate that the network is in a stable state or the network completes the test phase. The first time information is determined by the first network device based on the first network status. The sending module 1203 is configured to send the data to the first network device based on the second indication information.

Optionally, the resource management apparatus further includes the processing module 1202. The processing module 1202 is configured to obtain training data from a third network device based on the second indication information, where the third network device is different from the second network device. The processing module 1202 is configured to generate the data based on the training data.

Optionally, the first network device includes a network management device, and the resource management apparatus includes a network data analytics device.

Optionally, the data includes network experience data. The network experience data is used to indicate network service quality.

In addition, the receiving module 1201, the processing module 1202, and the sending module 1203 in the foregoing resource management apparatus can further implement other operations and functions of the second network device in FIG. 11 in the foregoing method. Details are not described herein again.

Figure 12B:
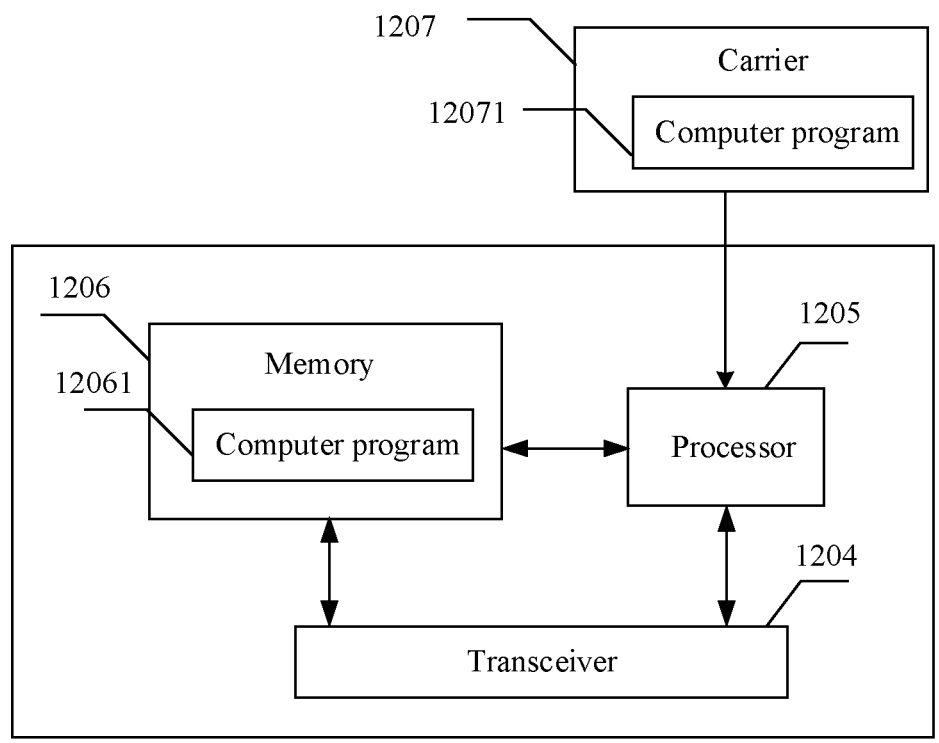

FIG. 12B is another possible schematic diagram of the resource manage apparatus in the foregoing embodiments. The resource management apparatus includes a transceiver 1204 and a processor 1205, as shown in FIG. 12B. For example, the processor 1205 may be a general-purpose microprocessor, a data processing circuit, an ASIC, or an FPGA circuit. The resource management apparatus may further include a memory 1206. For example, the memory is a random-access memory (RAM). The memory is configured to be coupled to the processor 1205, and stores a computer program 12061 necessary for the resource management apparatus.

In addition, the resource management methods in the foregoing embodiments further provide a carrier 1207. A computer program 12071 of the resource management apparatus is stored in the carrier, and the computer program 12071 may be loaded to the processor 1205. The carrier may be an optical signal, an electrical signal, an electromagnetic signal, or a computer-readable storage medium (for example, a hard disk).

When the computer program 12061 or 12071 is run on a computer (for example, the processor 1205), a computer may be enabled to perform the foregoing methods.

For example, in an embodiment, the processor 1205 is configured to perform other operations or functions of the first network element in FIG. 10. The transceiver 1204 is configured to implement communication between the resource management apparatus and a network management device/a network data analytics device.

In another embodiment, the processor 1205 is configured to perform other operations or functions of the network management device in FIG. 10. The transceiver 1204 is configured to implement communication between the resource management apparatus and a network data analytics device/a first network element.

In another embodiment, the processor 1205 is configured to perform other operations or functions of the first network device in FIG. 11. The transceiver 1204 is configured to implement communication between the resource management apparatus and a second network device/a network data analytics device.

In another embodiment, the processor 1205 is configured to perform other operations or functions of the second network device in FIG. 11. The transceiver 1204 is configured to implement communication between the resource management apparatus and a first network device/a network data analytics device.

A controller/processor configured to perform the foregoing resource management apparatus in this application may be a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in this application. The processor may alternatively be a combination of processors implementing a computing function, for example, a combination of one or more microprocessors or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM, a flash memory, a read-only memory (ROM), an erasable programmable ROM (EPROM), an electrically EPROM (EEPROM), a register, a hard disk, a removable hard disk, a compact disc (CD) ROM (CD-ROM), or a storage medium of any other form known in the art. For example, a storage medium is coupled to a processor such that the processor can read information from the storage medium or write information to the storage medium. Certainly, the storage medium may be a component of the processor. The processor and the storage medium may be located in the ASIC. In addition, the ASIC may be located in the resource management apparatus. Certainly, the processor and the storage medium may exist in the resource management apparatus as discrete components.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, improvement, or the like made based on the technical solutions of the present disclosure shall fall within the protection scope of the present disclosure.

What is claimed is:

1. A resource management method implemented by a network management device in a network, wherein the resource management method comprises:
    obtaining a first service experience data set of a service executed by a plurality of first user terminal devices in the network, wherein the first service experience data set comprises one or more first pieces of first service experience data, and wherein each of the first pieces indicates a service quality experienced by at least two of the first user terminal devices executing the service in the network;
    obtaining first performance information about a first service quality requirement of the service;
    determining whether the network is capable of satisfying the first service quality requirement based on the first service experience data set, a first network data set of the network, and the first performance information, wherein each piece of first network data comprises a device-level performance parameter, an interface-level performance parameter, and a network-level performance parameter; and
    adjusting a resource and/or a configuration of the network when the network management device determines that the network cannot satisfy the first service quality requirement.

2. The resource management method of claim 1, wherein the network comprises a network slice, a network slice instance, or a network slice subnet instance.

3. The resource management method of claim 1, wherein the network management device comprises an operation, administration, and maintenance (OAM) network element or a network slice management function (NSMF) network element.

4. The resource management method of claim 1, wherein obtaining the first service experience data set comprises obtaining the first service experience data set from a network data analytics device.

5. The resource management method of claim 1, wherein the device-level performance parameter is of a single user terminal device in the plurality of first user terminal devices, wherein the interface-level performance parameter is of an interface associated with the network management device, and wherein the network-level performance parameter comprises an end-to-end performance parameter of the network.

6. The resource management method of claim 1, wherein the first performance information indicates a first requirement on the first service experience data or a second requirement on the service quality.

7. The resource management method of claim 1, wherein each of the first pieces comprises at least one of service identification information of the service, network identification information of the network, first time information identifying a period in which the at least two user terminal devices experienced the service quality, first location information identifying a location at which the at least two user terminal devices experienced the service quality, or proportion information of a quantity of second user terminal devices whose service experience satisfies a third service quality requirement.

8. The resource management method of claim 1, wherein the first network data set further comprises one or more second pieces of second network data, and wherein each of the second pieces comprises at least one of network identification information of the network, second time information, second location information, network policy information for adjusting the resource and/or the configuration of the network, network device information, network interface information, or end-to-end performance information of the network.

9. The resource management method of claim 8, wherein the network device information comprises at least one of the following:
   identification information of the network device;
   information about a quantity of registered subscribers;
   information about a quantity of online users;
   resource information;
   performance parameter measurement information;
   key performance indicator information; or
   association identification information of a single user that executes the service in the network device.

10. An apparatus comprising:
   a memory configured to store a program code; and
   a processor coupled to the memory and configured to execute the program code to cause the apparatus to be configured to:
      obtain a first service experience data set of a service executed by a plurality of user terminal devices in a network, wherein the first service experience data set comprises one or more pieces of first service experience data, and wherein each of the pieces indicates a service quality experienced by at least two of the user terminal devices executing the service in the network;
      obtain performance information about a first service quality requirement of the service;
      determine the network is capable of satisfying the first service quality requirement based on the first service experience data set, a first network data set of the network, and the performance information, wherein each piece of first network data comprises a device-level performance parameter, an interface-level performance parameter, and a network-level performance parameter; and
      adjust a resource and/or a configuration of the network when the apparatus determines that the network data set cannot satisfy the first service quality requirement.

11. A system for resource management comprising:
   a network data analytics device configured to send a first service experience data set of a service executed by a plurality of first user terminal devices in a network, wherein the first service experience data set comprises one or more first pieces of first service experience data, and wherein each of the first pieces indicates a service quality experienced by at least two of the first user terminal devices executing the service in the network; and
   a network management device coupled to the network data analytics device and configured to:
      obtain the first service experience data set from the network data analytics device;
      obtain first performance information about a first service quality requirement of the service;
      determine whether the network is capable of satisfying the first service quality requirement based on the first service experience data set, a first network data set of the network, and the first performance information, wherein each piece of first network data comprises a device-level performance parameter, an interface-level performance parameter, and a network-level performance parameter; and
      adjust a resource and/or a configuration of the network when the network management device determines that the network cannot satisfy the first service quality requirement.

12. The system of claim 11, wherein the network comprises a network slice, a network slice instance, or a network slice subnet instance.

13. The system of claim 11, wherein the network management device comprises an operation, administration, and maintenance (OAM) network element or a network slice management function (NSMF) network element.

14. The system of claim 11, wherein the network-level performance parameter comprises an end-to-end performance parameter of the network.

15. The system of claim 11, wherein the first performance information indicates a first requirement on the first service experience data or a second requirement on the service quality.

16. The system of claim 11, wherein each of the first pieces comprises at least one of service identification information of the service, network identification information of the network, first time information, first location information, or proportion information of a quantity of second users, and wherein a service experience of each of the second users satisfies a third requirement.

17. The system of claim 11, wherein the first network data set further comprises one or more second pieces of second network data, wherein each of the second pieces comprises at least one of network identification information of the network, second time information, second location information, network device information, network interface information, or end-to-end performance information of the network.

18. The system of claim 17, wherein the network device information comprises at least one of the following:
   identification information of the network device;
   information about a quantity of registered subscribers;
   information about a quantity of online users;
   resource information;
   performance parameter measurement information;
   key performance indicator information; or
   association identification information of a single user that executes the service in the network device.

19. A resource management method comprising:
   sending, by a network data analytics device in a network, a first service experience data set of a service executed by a plurality of first user terminal devices to a network management device, wherein the first service experience data set comprises one or more first pieces of first service experience data, and wherein each of the first pieces indicates a service quality experienced by at least two of the first user terminal devices executing the service in the network;
   obtaining, by the network management device, the first service experience data set from the network data analytics device;
   obtaining, by the network management device, first performance information about a first service quality requirement of the service;
   determining, by the network management device, whether the network is capable of satisfying the first service quality requirement based on the first service experience data set, a first network data set of the network, and the first performance information, wherein each piece of first network data comprises a device-level performance parameter, an interface-level performance parameter, and a network-level performance parameter; and adjusting, by the network management device, a resource and/or a configuration of the network when the network management device determines that the network cannot satisfy the first service quality requirement.

20. The resource management method of claim 19, wherein the network comprises a network slice, a network slice instance, or a network slice subnet instance.

* * * * *